(12) United States Patent
Heflich et al.

(10) Patent No.: US 12,491,209 B2
(45) Date of Patent: *Dec. 9, 2025

(54) DISSOLVED C60 AND METHOD OF PRODUCING DISSOLVED C60

(71) Applicant: Innovation for Success, LLC, Doylestown, PA (US)

(72) Inventors: Leonard W. Heflich, Doylestown, PA (US); George W. Monlux, Jr., St. Petersburg, FL (US)

(73) Assignee: Innovation for Success, LLC, Doylestown, PA (US)

( * ) Notice: Subject to any disclaimer, the term of this patent is extended or adjusted under 35 U.S.C. 154(b) by 779 days.

This patent is subject to a terminal disclaimer.

(21) Appl. No.: 17/809,179

(22) Filed: Jun. 27, 2022

(65) Prior Publication Data

US 2022/0323491 A1 Oct. 13, 2022

Related U.S. Application Data

(63) Continuation-in-part of application No. 17/078,554, filed on Oct. 23, 2020, now Pat. No. 11,400,113, which is a continuation-in-part of application No. 16/819,552, filed on Mar. 16, 2020, now Pat. No. 10,842,742.

(60) Provisional application No. 62/884,198, filed on Aug. 8, 2019.

(51) Int. Cl.
| | |
|---|---|
| *A61K 33/44* | (2006.01) |
| *A61K 9/00* | (2006.01) |
| *A61K 9/127* | (2025.01) |
| *A61K 47/06* | (2006.01) |
| *A61M 11/00* | (2006.01) |

(52) U.S. Cl.
CPC ............ *A61K 33/44* (2013.01); *A61K 9/0043* (2013.01); *A61K 9/127* (2013.01); *A61K 47/06* (2013.01); *A61M 11/007* (2014.02)

(58) Field of Classification Search
None
See application file for complete search history.

(56) References Cited

U.S. PATENT DOCUMENTS

| | | | |
|---|---|---|---|
| 9,663,734 B2 | 5/2017 | Rostro et al. | |
| 11,400,113 B2 * | 8/2022 | Heflich | ................ A61K 33/44 |
| 2003/0162837 A1 | 8/2003 | Dugan et al. | |
| 2019/0083622 A1 | 3/2019 | Raderman et al. | |
| 2019/0133994 A1 | 5/2019 | Smith et al. | |

OTHER PUBLICATIONS

Bakry et al., Medicinal Applications of Fullerenes. International Journal of Nanomedicine (2007), 2(4), pp. 639-649.
Chistyakov et al., Possible Mechanisms of Fullerene C60 Antioxidant Action. BioMed Research International (2013), vol. 2013, Article ID 821498, 4 pages.
Liu et al., The Applications of Buckminsterfullerene C60 and Derivatives in Orthopaedic Research. Connect Tissue Res. (2014), 55(2), pp. 71-79.
Markovic et al., Biomedicinal Potential of the Reactive Oxygen Species Generation and Quenching by Fullerenes (C60). Biomaterials (2008), 29, pp. 3561-3573.
Konopelko et al., Adducts Formation at Fullerenes C60 and C70 Dissolution in Essential Oils. Russian Journal of General Chemistry (2014), 84(2), pp. 205-208.
Shimada et al., Development and Evaluation of an Aerosol Generation and Supplying System for Inhalation Experiments of Manufactured Nanoparticles. Environmental Science & Technology (2009), 43(14), pp. 5529-5534.
Zhou et al., Inhalable gadofullerenol/[70] fullerenol as high-efficiency ROS scavengers for pulmonary fibrosis therapy. Nanomedicine: Nanotechnology, Biology, and Medicine (2018), 14, pp. 1361-1369.

* cited by examiner

*Primary Examiner* — Brian J Davis
(74) *Attorney, Agent, or Firm* — Maginot, Moore & Beck

(57) ABSTRACT

A method of administering C60 to a user includes combining C60 molecules with a limonene composition to form a C60 mixture, heating the C60 mixture to a predetermined temperature for a predetermined time period to dissolve the C60 molecules into the limonene composition to form a dissolved C60 mixture, and administering the dissolved C60 mixture to a nasal cavity of the user via nasal administration.

18 Claims, 17 Drawing Sheets

DISSOLVED C60 AND METHOD OF PRODUCING DISSOLVED C60

This application is a continuation-in-part of U.S. application Ser. No. 17/078,554, filed on Oct. 23, 2020, which is a continuation-in-part of U.S. application Ser. No. 16/819,552, filed on Mar. 16, 2020, which claims the benefit of priority of U.S. provisional application Ser. No. 62/884,198, filed on Aug. 8, 2019 the disclosures of which are herein incorporated by reference in their entirety.

FIELD

This disclosure relates to the field of nanomaterials and, in particular, to dissolving nanomaterials in a liquid medium suitable for therapeutic, nutritional, and medicinal applications.

BACKGROUND

Nanomaterials are materials of which a single unit is sized, in at least one dimension, from approximately one nanometer (1 nm) to approximately one thousand nanometers (1,000 nm) and often from approximately one nanometer (1 nm) to approximately one hundred nanometers (100 nm). One type of nanomaterial or sub-nanomaterial is the C60 molecule, which is also referred to as C.60, C-60, $C_{60}$, Buckminsterfullerene, fullerene, and buckyballs. The C60 molecule is an allotrope of carbon and consists of carbon atoms connected by single and double bonds so as to form a closed mesh. Each C60 molecule includes sixty atoms of carbon arranged in a soccer ball-like shape that includes twenty hexagons and twelve pentagons with a carbon atom at each vertex of each hexagon and pentagon. The C60 molecules have a diameter of approximately 0.72 nm; thus, C60 is typically referred to as either a nanomaterial or a sub-nanomaterial.

C60 is typically formed through a combustion process that isolates C60 molecules from soot. To prepare C60 for therapeutic or nutritional usage, the C60 is mixed with an edible oil, such as olive oil, for example. Known processes for mixing C60 in olive oil are extremely time consuming and expensive because C60 dissolves only to a trivial extent in olive oil. Specifically, the solubility of C60 in olive oil is no more than approximately 0.9 mg/ml. Moreover, when C60 is mixed with olive oil, the C60 tends to agglomerate and to resist dissolution. To overcome this issue, researchers sonicate and stir the C60 and olive oil mixture for five to ten days to attempt to break up clumps of the C60. Even after this extremely lengthy process, however, only a trivial amount of the C60 becomes dissolved in the olive oil with the remainder of the C60 molecules packed together in microscopic clumps. As such, only a trivial amount of the C60 in the olive oil mixture is bioactive and most of the C60 is unavailable for therapeutic, nutritional, and medicinal benefits. Moreover, the mixture of olive oil and C60 is subject to settling and reagglomeration (i.e. the olive oil and C60 mixture is unstable), thereby further reducing therapeutic and nutritional benefits of the C60.

Based on the above, further developments in the area of preparing C60 for therapeutic, nutritional, and medical applications are desired.

SUMMARY

According to an exemplary embodiment of the disclosure, a method of administering C60 to a user includes combining C60 molecules with a limonene composition to form a C60 mixture, heating the C60 mixture to a predetermined temperature for a predetermined time period to dissolve the C60 molecules into the limonene composition to form a dissolved C60 mixture, and administering the dissolved C60 mixture to a nasal cavity of the user via nasal administration.

According to another exemplary embodiment of the disclosure, a nasal spray system includes a reservoir, an applicator, and a nasal mixture. The applicator has a nozzle configured to generate a spray. The applicator is operably connected to the reservoir. The nasal mixture includes a dissolved C60 mixture. The nasal mixture is contained in the reservoir. The nasal mixture is configured to be sprayed by the nozzle. The dissolved C60 mixture includes C60 molecules dissolved in a limonene composition. The nasal mixture is configured for administration to a nasal cavity of a user via nasal administration.

According to a further exemplary embodiment of the disclosure, a method of administering C60 to a user includes combining C60 molecules with a limonene composition to form a C60 mixture, and heating the C60 mixture to a predetermined temperature for a predetermined time period to dissolve the C60 molecules into the limonene composition to form a dissolved C60 mixture. The method further includes mixing the dissolved C60 mixture with a phospholipid to form a plurality of liposomes, combining the plurality of liposomes with a nasal solution to form a nasal mixture, and administering the nasal mixture to a nasal cavity of the user via nasal administration.

In the dissolved state, C60 molecules have many potential therapeutic, nutritional, and medicinal applications. Progress in applying C60 molecules, however, has thus far been hampered by the fact that C60 molecules are insoluble in aqueous media. To date, only inedible and toxic solvents have shown any significant ability to solubilize and/or dissolve C60 molecules without chemical modification or derivatization, which changes the nature and action of the C60 molecule.

The disclosure describes a breakthrough in preparing solubilized C60 for therapeutic, nutritional, and medicinal applications. Specifically, it was discovered that C60 is highly soluble/dissolvable in limonene and d-limonene, which are referred to herein as a limonene composition. The limonene composition is an edible and non-toxic liquid in which C60 molecules readily dissolve when the mixture is heated. The resultant dissolved C60 mixture is produced in a matter of minutes (about thirty minutes, in one embodiment) and, therefore, is many times faster and easier to produce than the mixture of C60 and olive oil. Additionally, the dissolved C60 mixture disclosed herein is stable and includes C60 molecules homogeneously dispersed throughout the mixture. Thus, the dissolved C60 mixture is a huge advancement over the C60 and olive oil mixture, which is unstable (i.e. subject to settling and reagglomeration) and includes C60 molecules in a clumped, non-uniform, and nonhomogeneous mixture. The dissolved C60 mixture disclosed herein is particularly useful in applications in which a specific quantity of C60 molecules are dosed, such as for therapeutic, nutritional, and medical applications.

The dissolved C60 mixture is a safe and edible mixture including C60 molecules at a sufficient concentration and stability to be practical in preparing test applications. The method disclosed herein does not change the nature, action, and structure of the C60 molecule. Additionally, using the dissolved C60 mixture to prepare a liposomal dispersion creates a convenient, stable, and safe aqueous solution of C60 molecules. The method disclosed herein produces a water soluble C60 mixture in a convenient, safe, stable, and inexpensive way. The method is a dramatic improvement over previous attempts to improve the solubility of C60, such as by derivatizing C60 with hydroxyl groups to create a Fullerol.

DETAILED DESCRIPTION

Figure 1:
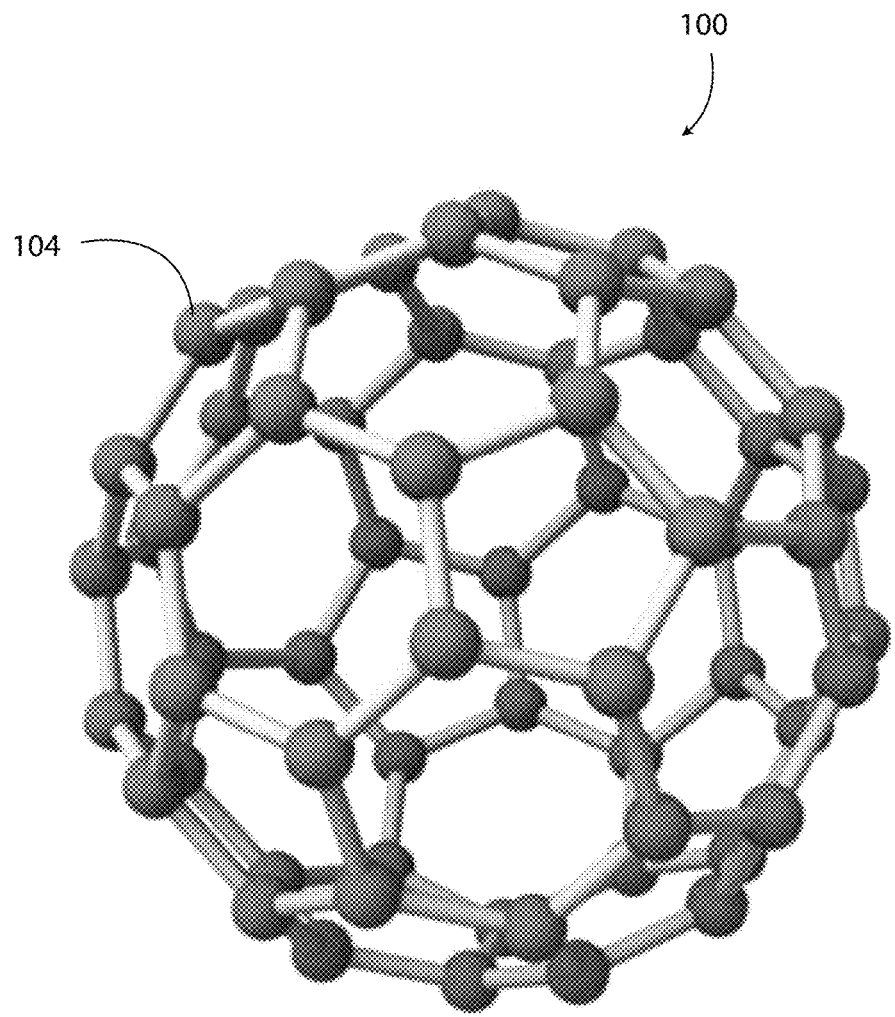
FIG. 1 is a block diagram of a C60 molecule.

For the purpose of promoting an understanding of the principles of the disclosure, reference will now be made to the embodiments illustrated in the drawings and described in the following written specification. It is understood that no limitation to the scope of the disclosure is thereby intended.

It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment," "an embodiment," "an exemplary embodiment," and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The terms "comprising," "including," "having," and the like, as used with respect to embodiments of the disclosure, are synonymous.

As used herein, the term "approximately" means within plus or minus 5% of the stated value.

As shown in FIG. 1, a C60 molecule 100 includes sixty atoms of carbon 104 arranged in a soccer ball-like shape. As used herein, the term "C60" refers to a plurality of the C60 molecules 100. C60 is available as a powder that is formed by pulverizing masses or crystals of C60. When ingested, C60 is a powerful antioxidant and free radical scavenger. C60 also provides numerous other health and nutritional benefits to humans and animals, such as reducing inflammation, increasing energy, reducing symptoms of arthritis, increasing longevity, and protecting against excessive and uncontrolled free radical exposure as occurs in many disease states. Additional health benefits of C60 are described herein.

An obstacle to administering C60 is that the C60 molecules 100 tend to clump together in masses, especially when prepared according to known processes including edible oil mixtures, such as olive oil mixtures. As such, it is difficult to administer or to dose a predetermined amount of C60, because of the heterogeneous, non-homogenous, and/or non-uniform distribution of the C60 molecules 100 in the oil. Moreover, known solvents in which C60 is readily dissolvable are not food-grade, are inedible, are toxic, and/or are not safe for human consumption. For example, C60 dissolves in solvents such as carbon disulfide, 1-chloronapthalene, toluene, and p-xylene (xylene), all of which are toxic and inedible. Table 1, included herein, identifies the solubility of C60 in various solvents. C60 dissolves only to a trivial extent in olive oil (0.9 mg/ml), and the process of breaking up clumps of the C60 molecules 100 in the olive oil is laborious, inconsistent, and largely ineffective.

In an unexpected breakthrough, C60 is dissolved in a limonene composition to form a mixture including dissolved C60 that is homogenous and stable. As used herein, the limonene composition includes limonene and/or d-limonene. The limonene composition may include 100% limonene, 100% d-limonene, and mixtures of limonene and d-limonene.

Limonene and d-limonene are excellent liquid media for dissolving C60 molecules 100. Limonene is a colorless and transparent liquid aliphatic hydrocarbon classified as a cyclic terpene, and is a major component in the oil of citrus fruit peels. Limonene is a chiral molecule. Limonene has a very low toxicity, and humans are rarely allergic to limonene. Limonene assists in the absorption of other terpenoids and chemicals through the skin, mucous membranes, and digestive tract. Limonene is also used as a botanical insecticide.

D-limonene is the d-isomer of limonene and has a strong smell of oranges and a bitter taste. D-limonene is used as a fragrance ingredient in cosmetic products and also as a flavoring agent in food manufacturing. D-limonene and limonene are food-grade, edible, non-toxic, and safe for human and animal consumption and ingestion. D-limonene, which is a monoterpene, is obtained commercially from citrus fruits through centrifugal separation or steam distillation, for example. D-limonene is a colorless and transparent liquid. D-limonene is plentiful and inexpensive.

Figure 2:
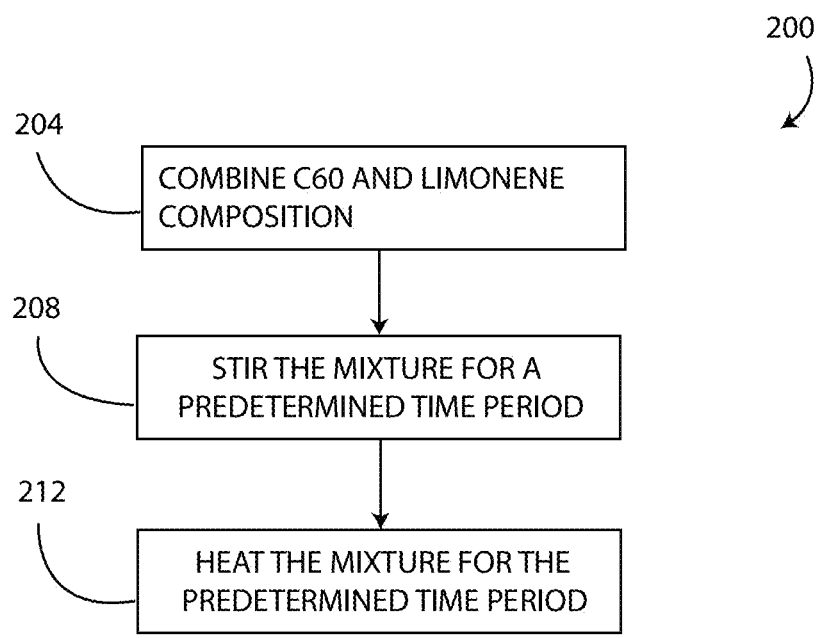
FIG. 2 is a flowchart illustrating an exemplary method of dissolving C60 molecules in a limonene composition to form an edible, food-grade, dissolved C60 mixture.
Figure 3:
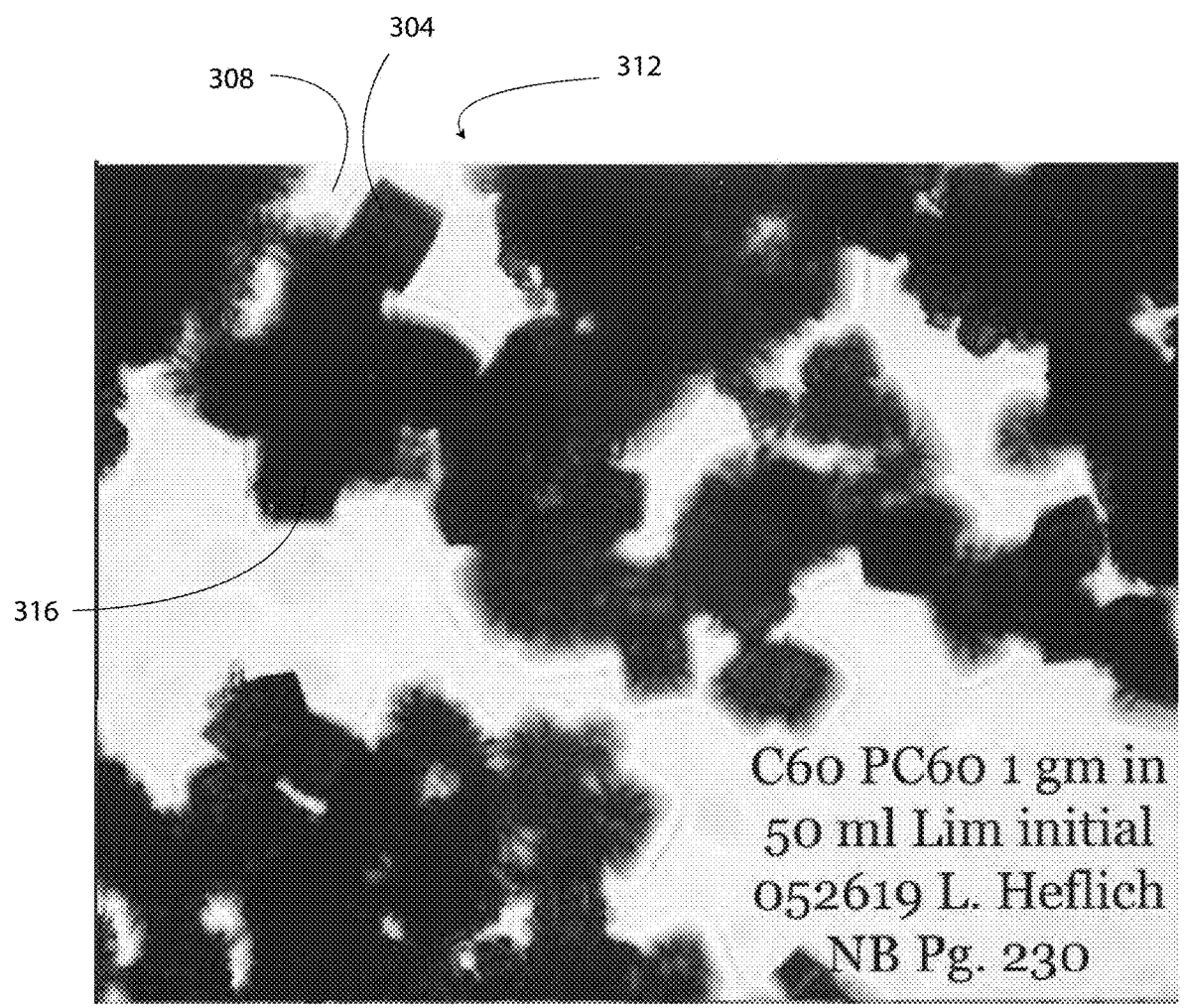
FIG. 3 is a plan view at 1000× magnification showing C60 combined with the limonene composition at the beginning of the method of FIG. 2.

As shown in the flowchart of FIG. 2 and with additional reference to FIG. 3, a method 200 for dissolving C60 304 in a liquid medium that is non-toxic and safe for human consumption includes combining C60 304 with a limonene composition 308 to form a C60 mixture 312. (Block 204). The limonene composition 308 is discussed in connection with the method 200, but the limonene composition 308 may be substituted with orange terpenes or other edible and non-toxic terpenes (or terpene containing liquids). The limonene composition 308 is used over orange terpenes, because the limonene composition 308 has a more pleasant and less bitter taste. In one embodiment, the limonene composition 308 is at least 95% d-limonene by volume, with the remaining 5% including any other liquid, such as limonene, flavoring, fragrances, and the like. In another embodiment, the limonene composition 308 is at least 75% d-limonene with the remaining 25% including any other liquid, such as limonene, flavoring, fragrances, and the like.

At block 204 of the method 200, the C60 304 is pulverized into a powdered form and combined with the liquid limonene composition 308 in a glass vessel (not shown) or any other heat-safe and non-reactive container. Additionally or alternatively, the C60 304 is not pulverized and is added to the limonene composition 308 in granular, chunky, or crystalline state.

In FIG. 3, the C60 mixture 312, which includes the C60 304 and the limonene composition 308, is illustrated at room temperature of about 70° F. (21° C.). Specifically, FIG. 3 is a 1000× magnification view of one gram (1 g) of pulverized C60 304 mixed with sixty milliliters (60 ml) of the limonene composition 308. The molecules of the C60 304 have formed small clumps 316 and have not immediately dissolved into the limonene composition 308. Moreover, when viewed in color, the limonene composition 308 is colorless and transparent, and the C60 304 has a mostly black color. Any apparent color of the limonene composition 308 in FIG. 3 is the result of an incandescent light source giving the limonene composition 308 a yellowish hue in certain photographic representations.

Next, at blocks 208 and 212 of the method 200, the C60 mixture 312 is stirred and heated for a predetermined time period. An exemplary predetermined time period is from twenty to forty minutes. In one embodiment, the predetermined time period is thirty minutes or approximately thirty minutes.

The C60 mixture 312 is stirred with a magnetic stirring system (not shown) that uses a rotating magnetic field to cause a stir bar immersed in the C60 mixture 312 to move. In other embodiments, any other stirring system may be utilized to stir the C60 mixture 312 including hand stirring with a suitable tool, such a glass stirrer shaft (not shown). Moreover, in other embodiments, no stirring of the C60 mixture 312 is performed and only the heating process is used to dissolve the C60 304 into the limonene composition 308.

The C60 mixture 312 is heated during the predetermined time period to a predetermined temperature by a hot plate or any other electric heating element system. An exemplary predetermined temperature is from approximately 250° F. to approximately 300° F. (121° C. to 149° C.). In one embodiment, the predetermined temperature is 275° F. (135° C.) or approximately 275° F. (135° C.). Additionally, or alternatively, the C60 mixture 312 is covered during the heating process (block 212), such as with a watch glass or any other suitable cover, to facilitate solvent reflux, returning the condensed solvent (i.e. the limonene composition 308) to the body of the solution.

Figure 4:
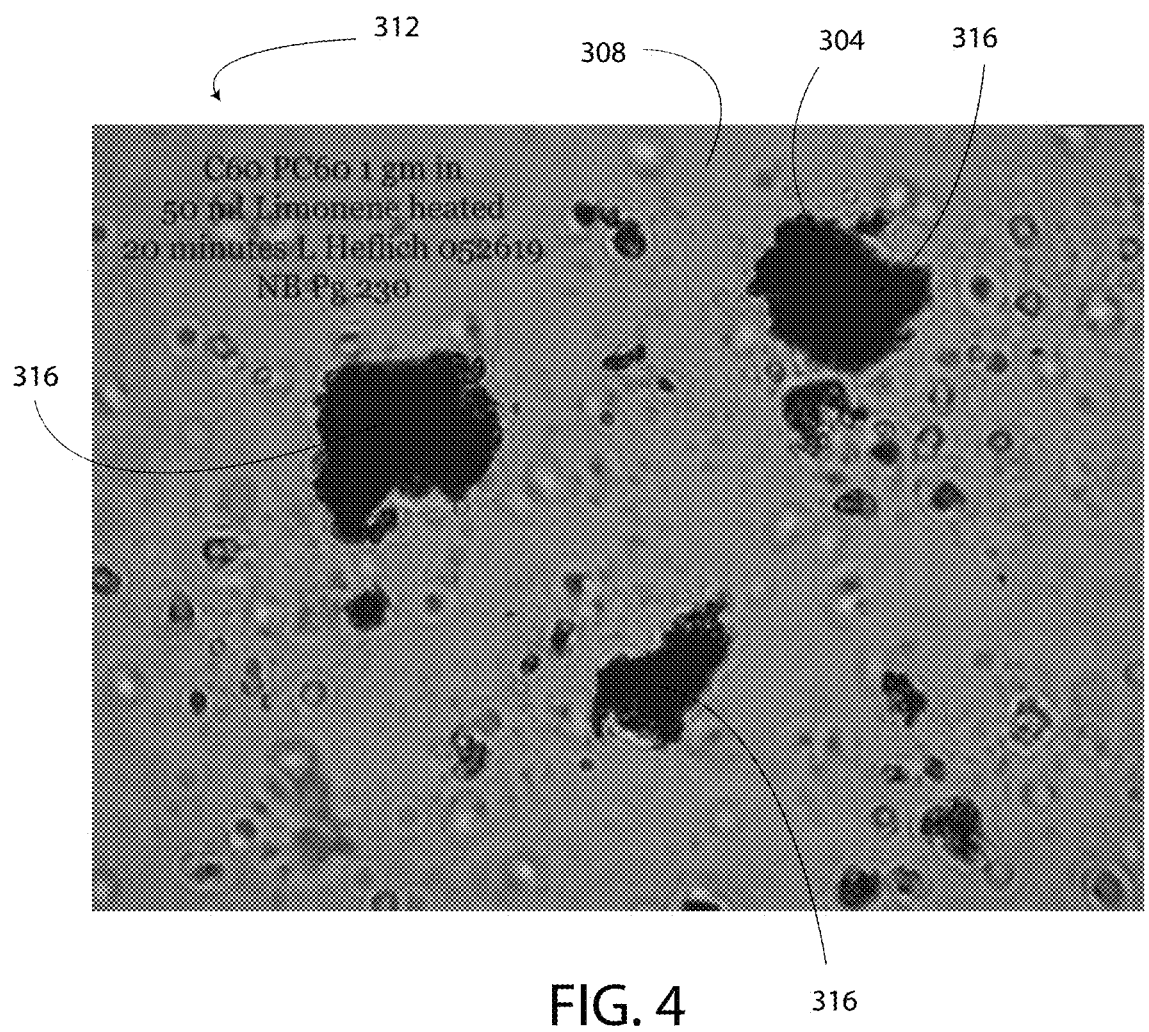
FIG. 4 is another plan view at 1000× magnification showing the C60 and limonene composition twenty minutes into the method of FIG. 2.
Figure 5:
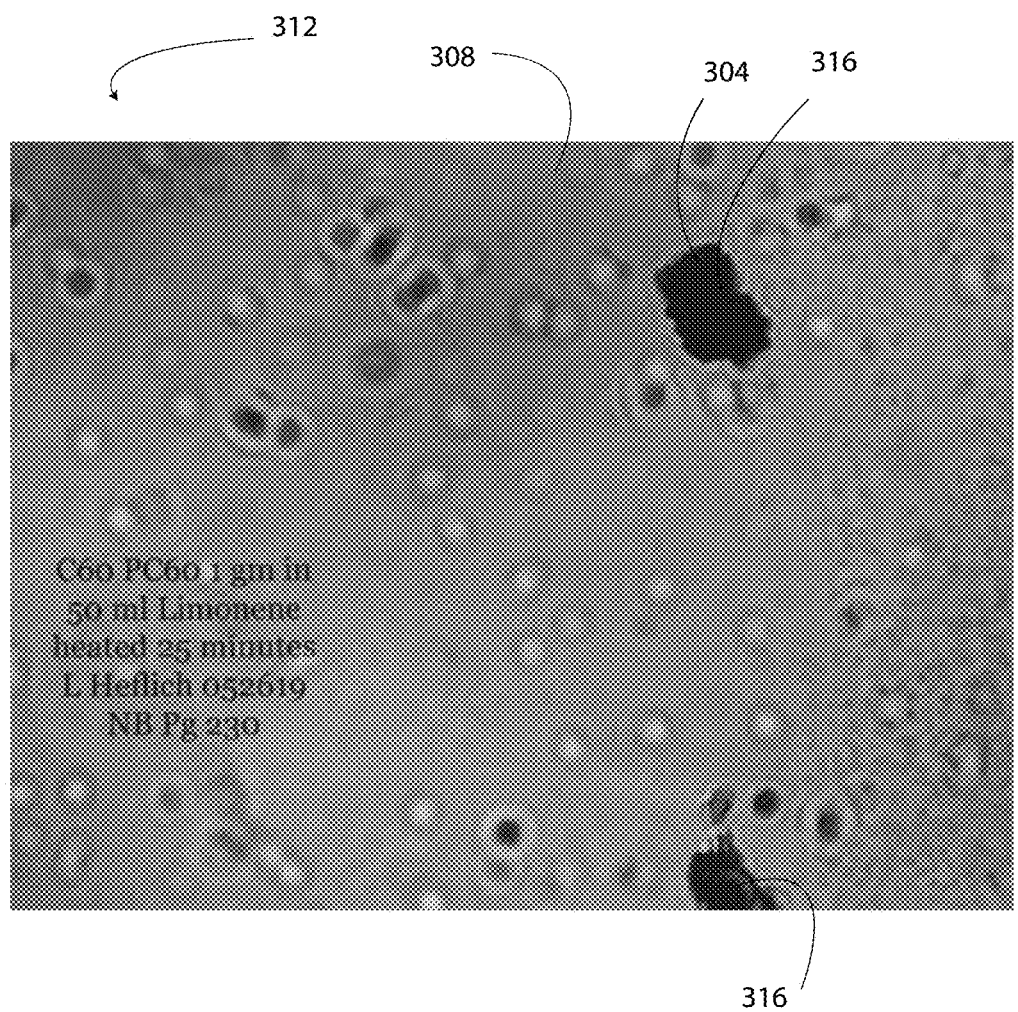
FIG. 5 is a further plan view at 1000× magnification showing the C60 and the limonene composition twenty-five minutes into the method of FIG. 2.

The stirring and heating of blocks 208 and 212 dissolves the C60 304 into the limonene composition 308. FIGS. 4 and 5 illustrate two additional stages of the stirring and heating process. In FIG. 4, the mixture 312 has been heated for twenty minutes and fewer clumps 316 of the C60 304 remain, as compared to FIG. 3, thereby indicating that more molecules of the C60 304 have dissolved into the limonene composition 308. When viewed in color, the C60 mixture 312 has become orange at the process stage illustrated in FIG. 4.

In FIG. 5, the C60 mixture 312 has been heated for twenty-five minutes and even fewer of the clumps 316 of the C60 304 remain, as compared to FIG. 4. The remaining clumps 316 of the C60 304 are very small. When viewed in color, the C60 mixture 312 has an orange color at the process stage illustrated in FIG. 5.

Figure 6:
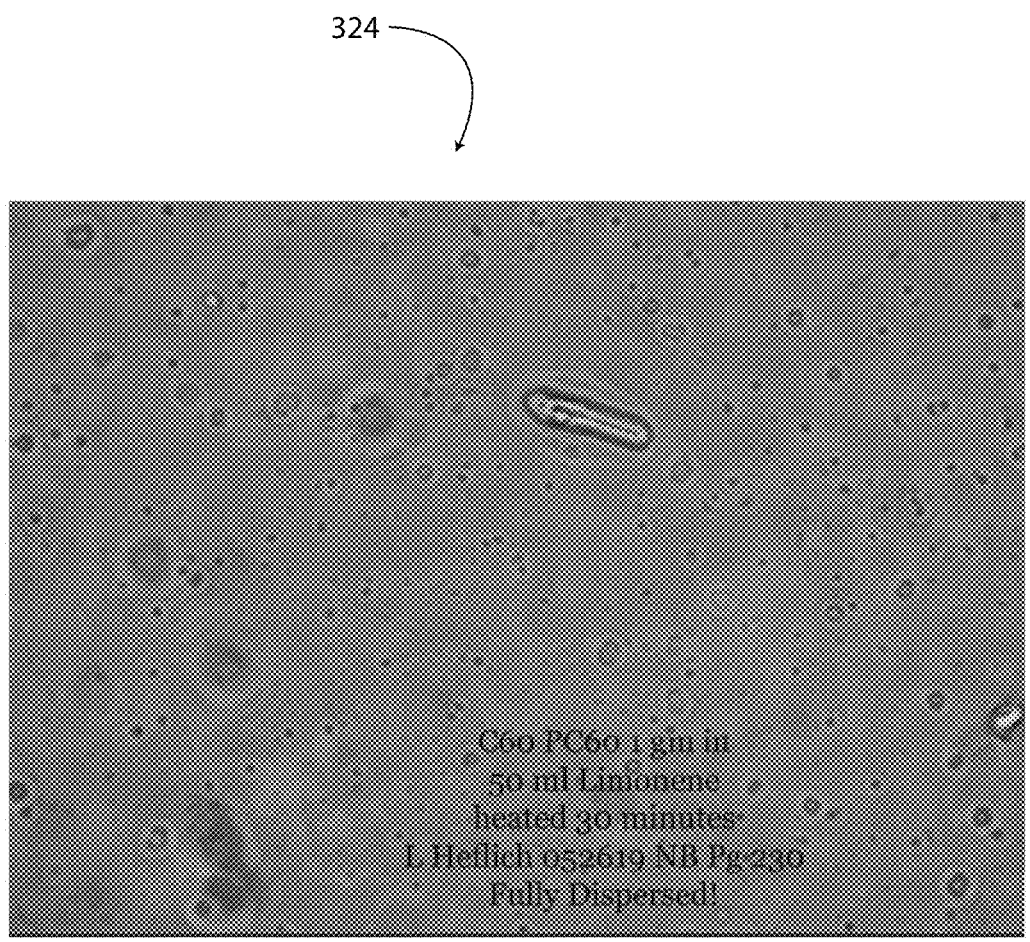
FIG. 6 is yet another plan view at 1000× magnification showing the C60 and the limonene composition thirty minutes into the method of FIG. 2 and illustrating the dissolved C60 mixture.

In FIG. 6, the C60 mixture 312 has been heated for thirty minutes and no clumps 316 of the C60 304 remain, indicating that in FIG. 6, a dissolved C60 mixture 324 is formed. As used herein, the dissolved C60 mixture 324 is a homogenous liquid including molecules of the C60 304 that are fully dissolved into the limonene composition 308 with no clumps 316 of the C60 304. The dissolved C60 mixture 324 is a clear solution (i.e. transparent) with a deep magenta color. Any artifacts illustrated in FIG. 6 are air bubbles or other features, but are not clumps 316 of the C60 304.

In some embodiments, at blocks 208 and 212 of the method 200, the C60 mixture 312 is sonicated to increase further the dissolution of the C60 304 into the limonene composition 308 and to assist in breaking up any of the clumps 316 of the C60 304. Sonication is a process of applying sound energy to the C60 mixture 312, thereby agitating the clumps 316 of the C60 304 and promoting full and timely dissolution of the molecules of the C60 304 into the limonene composition 308. A sonication system (not shown) may be placed near or in the C60 mixture 312 to perform the sonication.

As used herein, "dissolving" the C60 304 into the limonene composition 308 refers to forming a solution including a homogenous mixture of C60 molecules 100 (FIG. 1) and molecules of the limonene composition 308. In such a solution, the C60 304 is the solute and the limonene composition 308 is the solvent. In some embodiments, atomic level changes and bonds may occur between the dissolved C60 molecules 100 and molecules of the limonene composition 308; however, the C60 molecules 100 retain their shape as shown in FIG. 1 and also retain their therapeutic, nutritional, medicinal, and health benefits. The dissolved C60 mixture 324 may also be referred to as a C60 solution 324 including solubilized C60 304 in the limonene composition 308.

In an exemplary embodiment of the dissolved C60 mixture 324 made according to the method 200 of FIG. 2, the dissolved C60 mixture 324 includes 16.67 mg of dissolved C60 304 per one milliliter (1 ml) of the limonene composition 308. At the solubility of 16.67 mg/ml, the dissolved C60 mixture 324 is "stable," meaning that no settling or precipitating of the C60 304 occurs in the limonene composition 308, even after six weeks of sitting at room temperature. As disclosed herein, a limit of solubility of the C60 304 in the limonene composition 308 is from approximately 16.67 mg/ml to approximately 20.0 mg/ml. Accordingly, in other embodiments, the dissolved C60 mixture 324 includes from 0.50 mg to 20.0 mg of the dissolved C60 304 per one milliliter (1 ml) of the limonene composition 308.

When the dissolved C60 mixture 324 is made according to the method 200 of FIG. 2 with more than 16.67 mg of C60 304 per milliliter of the limonene composition 308, some settling of the C60 304 occurs when the dissolved C60 mixture 324 is cooled from the predetermined temperature to room temperature. The settled C60 304, however, can be easily "redissolved" by gently shaking and/or agitating the dissolved C60 mixture 324 at room temperature (i.e. without reheating). Whereas, when the dissolved C60 mixture 324 is made according to the method 200 of FIG. 2 with 16.67 mg or less of the C60 304 per milliliter of the limonene composition 308, no settling of the C60 304 occurs when the dissolved C60 mixture 324 is cooled from the predetermined temperature to room temperature, and the dissolved C60 mixture 324 is stable. For a point of reference, the limit of solubility of the C60 304 in toluene is 2.8 mg/ml and the limit of solubility of the C60 304 in olive oil is 0.9 mg/ml. Thus, the method 200 produces an edible solution with a high quantity of dissolved C60 molecules 100 per milliliter of solvent.

The method 200 of FIG. 2 works to dissolve all of the commercially available forms of C60 304 including those types of C60 304 having a snowflake appearance under magnification and those types of C60 304 having a crystalline (i.e. cubic or hexagonal) appearance under magnification.

As noted above, the stirring process of block 208 is optional, but the heating process of block 212 is typically performed. As disclosed herein, the C60 304 typically does not dissolve to any significant extent into the limonene composition 308 when the C60 mixture 312 is at room temperature 70° F. (21° C.). According to the unexpected breakthrough discovered herein, however, when the limonene composition 308 and the C60 mixture 312 is heated dissolution of the C60 304 occurs. As such, the method 200 is different than the process of mixing C60 304 in olive oil, which occurs at room temperature 70° F. (21° C.) over the course of many days without heating. In such a process, heating the olive oil does not produce any significant increase of solubility of C60 304, and does not produce any significant decrease in the mixing time. Moreover, heating the olive oil in an attempt to increase solubility of C60 304 fouls the olive oil, making the olive oil have an undesirable burnt taste and appearance. As such, the known olive oil process of mixing the C60 304 cannot be made more efficient by heating the olive oil. The known properties of C60 304 when mixed with olive oil make the high solubility of C60 304 in the heated limonene composition 308 even more of a surprise and a breakthrough.

The method 200 is orders of magnitude faster than the process of mixing C60 304 in olive oil. Mixing C60 304 in olive oil takes approximately seven days in order to break up the clumps of C60 304, and over the course of the seven days, only a trivial amount of the C60 304 is actually dissolved in the olive oil with the rest of the C60 304 being unevenly dispersed through the olive oil in small (e.g. microscopic) clumps. The method 200, as disclosed herein, dissolves the C60 304 in only thirty minutes, thereby offering huge time savings in preparing an edible, non-toxic, liquid-based dissolved C60 mixture 324.

The dissolved C60 mixture 324 of the present disclosure provides a convenient means of dosing a predetermined amount of the C60 304 by easily measuring a liquid quantity of the dissolved C60 mixture 324. That is, a known amount of the C60 304 can be dosed when the amount of the C60 304 and the amount of the limonene composition 308 used to form the dissolved C60 mixture 324 are known. For example, in an embodiment having one gram (1 gm) of the C60 304 and sixty milliliters (60 ml) of the limonene composition 308, each milliliter of the dissolved C60 mixture 324 contains 16.67 mg of the C60 304, since very little of the limonene composition 308 evaporates during the method 200.

The dissolved C60 mixture 324 is edible, safe, and non-toxic and is suitable for therapeutic and nutritional dosing of the C60 304 and the corresponding C60 molecules 100. Additionally, the dissolved C60 mixture 324 has a pleasant citrus taste and aroma. The dissolved C60 mixture 324 can be administered orally and swallowed, or administered orally and retained in the mouth for sublingual or buccal administration. The dissolved C60 mixture 324 can also be included in a topical cream for application to the skin and for transdermal administration of the C60 molecules 100. The dissolved C60 mixture 324 can be included in a liposomal dispersion for convenient oral administration.

The dissolved C60 mixture 324 is also highly bioactive. As used herein, "bioactive" means functional as an antioxidant. Clumped or undissolved C60, as is found in known olive oil mixtures, has little to no bioactivity and does not effectively migrate through cell walls and mitochondrial walls. Moreover, clumped or undissolved C60 is filtered out of the blood by the liver or the intestinal wall, thereby further preventing and/or limiting the bioactivity of the C60 molecules 100. The dissolved C60 mixture 324 is about 18.5× (i.e. (16.67 mg/ml)/(0.9 mg/ml)) more bioactive than olive oil mixtures including C60 (by volume), because the dissolved C60 mixture 324 includes orders of magnitude more dissolved C60 molecules 100 than is possible with any C60 and olive oil mixture.

The bioactive effect of the dissolved C60 mixture 324, in one embodiment, occurs when the C60 molecules 100, which are highly hydrophobic, migrate through cell walls and mitochondrial walls and come into contact with free radicals. Specifically, the C60 molecules 100 pass through cell walls and the blood/brain barrier to enter mitochondria, where most of the short-lived, highly reactive and, therefore, dangerous free radicals are produced. Consider in an example, the very damaging hydroxyl free radical, which exists on average for less than one ten billionth of a second, but during this time can negatively react with organic material inside a cell mitochondria. The highly-bioactive dissolved C60 mixture 324 enables the C60 molecules 100 to migrate into the mitochondria where the hydroxyl free radical and other free radicals are produced. The C60 molecules 100 neutralize the hydroxyl free radical and other free radicals by absorbing and/or sequestering free electrons from the free radicals. The free electrons are held inside of the carbon "cage structure" (see FIG. 1) of the C60 molecule 100, and cannot escape. Specifically, since the C60 molecule 100 is a hollow cage of inter-bonded carbon atoms, the free electrons are sequestered inside of the cage, stabilized by the thirty double bonds in the molecule 100. The excess electrons go inside the cage and do not come out. Other antioxidants absorb and/or sequester one free electron by holding the free electron on the surface of the antioxidant where the free electron can react and create additional free radicals. Whereas, C60 molecules 100 of the dissolved C60 mixture 324 absorb and/or sequester up to thirty-four electrons each and remain stable. The C60 molecule 100, unlike most other antioxidant molecules, does not become a prooxidant, releasing the captured electron(s) to create another free radical molecule. The C60 molecules 100 of the dissolved C60 mixture 324 diffuse throughout the entire body and then diffuse out of the body with a residence time of about five days, taking with them the sequestered and stabilized free electrons.

Figure 7:
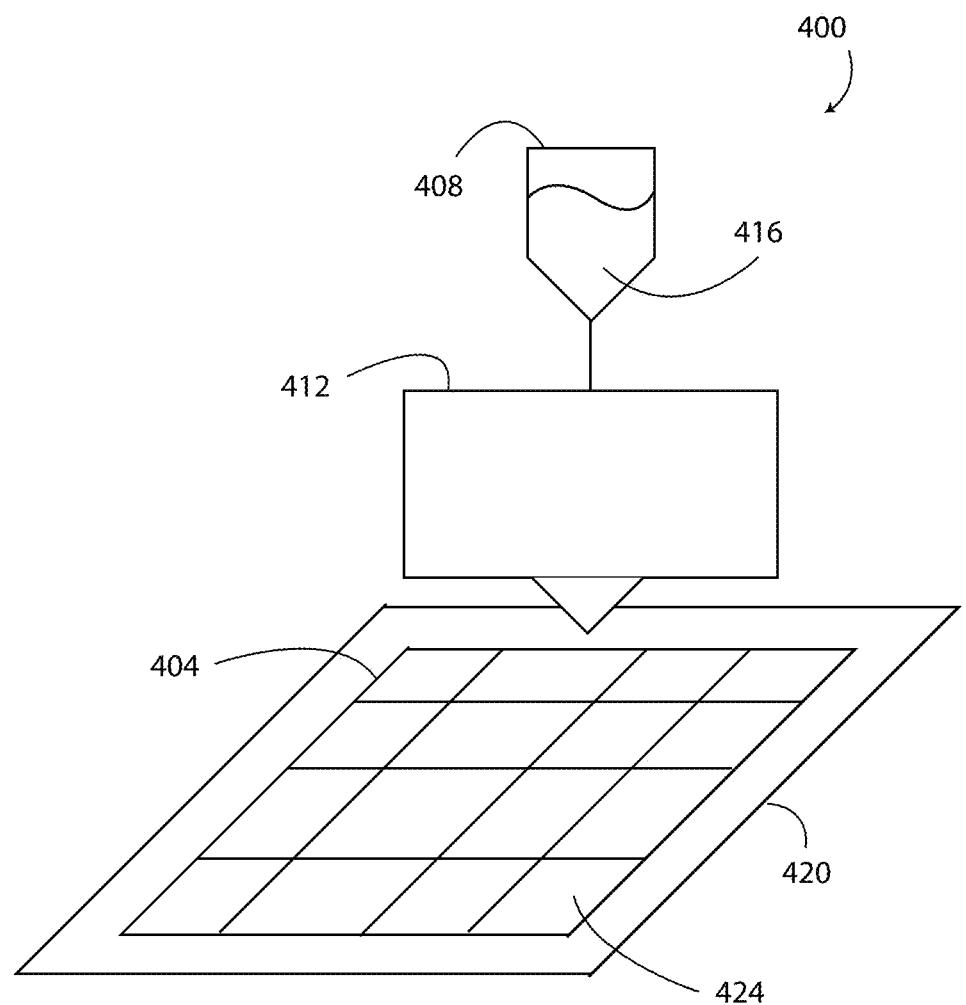
FIG. 7 is a block diagram illustrating a system for forming an orally dissolvable thin film including C60 molecules using the dissolved C60 mixture of FIG. 6.

As shown in FIG. 7, a system 400 is configured to prepare an orally dissolving edible thin film 404 including the C60 molecules 100. The thin film 404 including the C60 molecules 100 is also referred to herein as a therapeutic dosage form. A dosage form is a structure such as a pill, a capsule, a tablet, and in this example, a thin film. The dosage form delivers a particular dose of a substance, which in this disclosure is a particular dose of the C60 molecules 100.

The system 400 includes a container 408 fluidically connected to a thin film forming unit 412. The container 408 contains a combination of the dissolved C60 mixture 324 (made according to the method 200) and a thin film liquid to form a thin film mixture 416. The thin film forming unit 412 sprays or deposits the thin film mixture 416 onto a base 420 or a polished steel belt to form the thin film 404. The thickness of the thin film 404 is about 0.1 mm. The thin film 404 is then cut into pieces 424 (i.e. the therapeutic dosage form) having a predetermined area based on a desired dosage of the C60 molecules 100, for example. An exemplary predetermined area is approximately six square centimeters (6 cm$^2$).

Since the C60 molecules 100 are evenly and fully dissolved in the dissolved C60 mixture 324 only a brief (a few seconds to one minute) mixing time is required to evenly and fully distribute the C60 molecules 100 of the dissolved C60 mixture 324 throughout the thin film liquid when forming the thin film mixture 416. Moreover, due to the full dissolution of the C60 molecules 100 in the dissolved C60 mixture 324, the orally dissolvable thin film 404 has a predetermined amount of bioactive C60 molecules 100 per unit of area of the thin film 404. For example, in one embodiment, the thin film 404 includes twenty micrograms (20 μg) of the C60 molecules 100 per square centimeter of the thin film 404. The C60 molecules 100 are homogeneously dispersed throughout the thin film 404.

In an exemplary embodiment, the thin film liquid of the thin film mixture 416 is formed from or includes pullulan, which is a polysaccharide polymer that is edible, mostly tasteless, and is easily and quickly dissolvable in the mouth. The thin film liquid may also include gum arabic or any other chemical typically used in the production of orally dissolvable thin films.

The therapeutic dosage form 424 includes an effective dose of the C60 molecules 100. An effective dose is an amount of the C60 molecules 100 that is sufficient or desirable for providing a therapeutic, nutritional, and/or medicinal effect. An exemplary effective dose is approximately twenty micrograms (20 μg) of the C60 molecules 100. Since the thin film 404 includes a homogenous mixture of the C60 molecules, the effective dose is easily determined based on the area of the therapeutic dosage form 424. The therapeutic dosage form 424 is stable and has a long shelf life, unlike the olive oil and C60 mixture.

Figure 8:
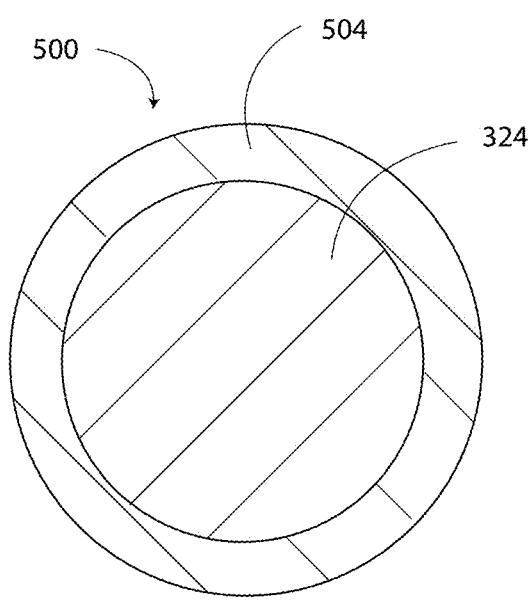
FIG. 8 is a cross sectional view of a liposome including the dissolved C60 mixture of FIG. 6.

In some embodiments, the thin film mixture 416 is an emulsion that is sprayed or deposited on the base 420. In another embodiment, as illustrated in FIG. 8, instead of mixing directly the dissolved C60 mixture 324 with the thin film liquid, the dissolved C60 mixture 324 is first mixed with a phospholipid 504 to form a plurality of liposomes 500. Each of the liposomes 500 includes a shell of the phospholipid 504 surrounding or encapsulating a quantity of the dissolved C60 mixture 324. The liposomes 500 are mixed with the thin film liquid to form the thin film mixture 416 that is sprayed or deposited on the base 420. The resulting thin film 404 includes liposomes 500 uniformly and homogeneously dispersed throughout the orally dissolvable thin film 404.

In another embodiment, the dissolved C60 mixture 324 is combined with a medication that is suitable for topical, intravenous, oral, intra-articular, spray, nebulized mist topical, nasal, pulmonary, or transcutaneous administration methods. For example, in one embodiment, the dissolved C60 mixture 324 is combined with cortisone and/or dapsone and is administered to a patient according to at least one of the administration methods listed above.

Figure 9:
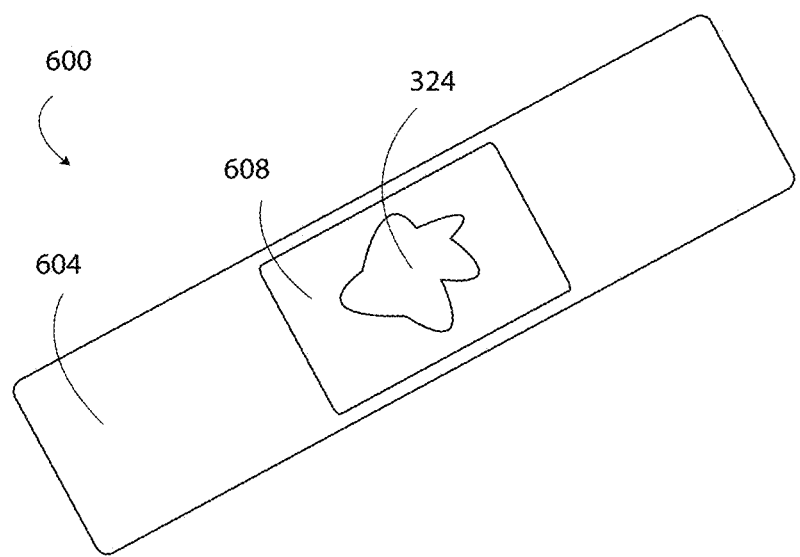
FIG. 9 is a block diagram illustrating an adhesive bandage including the dissolved C60 mixture of FIG. 6.

As shown in FIG. 9, an adhesive bandage 600 (i.e. a Band-Aid® brand bandage) includes the dissolved C60 mixture 324. The bandage 600 includes an adhesive strip 604, a pad 608 mounted on the adhesive strip 604, and the dissolved C60 mixture 324 applied to the pad 608. The adhesive strip 604 is configured to adhere to the skin of a user with the pad 608 placed over a wound and/or in contact with the wound. When the bandage 600 is adhered to a user, the dissolved C60 mixture 324 is topically applied to the wound from the pad 608. The terms "user" and "patient" are used synonymously herein. The dissolved C60 mixture 324 aids in healing of the wound by at least reducing inflammation at the wound site and reducing free radicals at the wound site that prevent healing. For example, the dissolved C60 mixture 324 can be sprayed on burns covering a large surface area to promote faster healing.

The method 200 of producing the dissolved C60 mixture 324 is distinguished from a mixture of C60 and olive oil based on the amount of the C60 304 that is dissolved in the solvent. For example, in the mixture of C60 and olive oil, only a trivial amount of the C60 actually dissolves in the olive oil even after one week of stirring. In the method 200, however, up to approximately 16.67 mg of the C60 304 per one milliliter (1 ml) of the limonene composition 308 is fully dissolved in the dissolved C60 mixture 324. As such, the dissolved C60 mixture 324 includes more bioactive C60 molecules 100 by volume than any mixture of C60 and olive oil, and is also easier and faster to produce. The dissolved C60 mixture 324 and the associated method 200 is and/or produces a soluble form of C60 304 using an edible food grade solvent (i.e. the limonene composition 308), which enables the human body to benefit from the full therapeutic, medicinal, and health effects of the C60 304, as compared to existing C60 mixtures using olive oil and the like.

The C60 mixture 324 is well-suited for administering to patients (both human and animal) during tests of the therapeutic, medical, and health benefits of C60 304 unlike mixtures of C60 and olive oil. Tests done to date using C60 and olive oil, are largely invalid because C60 dissolves only to a trivial extent in olive oil and the resultant mixture includes mostly undissolved and non-bioactive clumps of C60. Therefore, doses of the C60 and olive oil mixture have an inaccurate, unknowable, and/or inconsistent amount of C60 included therein. The tests are largely invalid, because the subjects were not given a precise amount of C60 with some subjects likely to have received little to no bioactive C60 in their dosage. The clumped and undissolved C60 in an olive oil mixture is removed by filtering mechanisms in the body, including the intestines, liver, and lungs, by at least the reticuloendothelial system (RES), which involves macrophages that engulf the particulate material through phagocytosis. Discovering a safe and stable way to dissolve the C60 304 (as is done by the method 200) enables accurate dosing, facilitates free movement of the C60 molecules 100 throughout the body in minutes, and permits the C60 molecules 100 to pass through cell membranes in order to be located inside cells and inside mitochondria where most free radicals are produced. The result is a reduction in damage to proteins, fats, and DNA caused by highly-reactive, short-lived, free radical molecules produced as a natural byproduct of respiration and oxidative stress produced by intense exercise. For example, cell respiration and energy production by the breakdown of glucose yields three free radicals per glucose molecule of hydrogen peroxide and hydroxyl radicals. C60 molecules 100 bond to these free radicals and remove them from the body. In addition, the C60 mixture 324 protects against environmental free radicals from exposure to UVA and UVB from intense sunlight, air pollution, cigarette smoke, and cosmic rays from high altitude airplane travel. Moreover, uncontrolled free radical production by the body is the causative factor of cellular damage and disease symptoms in almost all diseases. These diseases start out with a normal response of the body to foreign material, which is the production of free radicals to destroy the foreign material. For unknown reasons, the control mechanism gets stuck in the "on" position, resulting in the continued production of free radicals. The free radicals cause cellular damage, which then results in inflammation, and further production of free radicals in an increasing and uncontrolled spiral that results in the symptoms of the disease. There is evidence that C60 may be able to stop the overproduction of free radicals, allowing the body to repair, stopping the disease spiral.

With reference again to FIG. 1, the antioxidant properties of the C60 molecules 100 are based on the thirty-two aromatic rings of alternating conjugated double bonds with lowest unoccupied molecular orbitals (LUMO), which enable the molecule 100 to easily take up an electron from reactive oxygen species (e.g. free radicals). Free electrons from up to thirty-four methyl radicals have been absorbed onto a single C60 molecule 100. The quenching process is catalytic, such that the C60 molecule 100 can react with many superoxide molecules without being consumed. Due to this feature, C60 molecules 100 are the most efficient radical scavenger and are described as radical "sponges." An advantage of using C60 molecules 100 as an antioxidant is their ability to localize within the cell, such as in mitochondria and other cell compartment sites, where, in healthy and especially in diseased states, the production of destructive free radicals takes place.

Excess free radicals have been implicated in cell damage or death, neurologic damage, diseases such as Alzheimer's, Lou Gehrig's disease (ALS), cardiovascular disease, diabetes, hypertension, irritable bowel syndrome (IBS), autism, atherosclerosis, psychiatric conditions including anxiety, depression, and schizophrenia, and multiple skin conditions including atopic dermatitis, eczema, psoriasis and acne. Additional areas of potential application of the dissolved C60 mixture 324 include: radioprotective effects, burn dressing, chronic wound healing, osteoporosis, preventing UVA and UVB damage to skin, treating viral infections and psoriasis.

The dissolved C60 mixture 324 and the method 200 opens the door to medical applications of C60, including: antiviral, antioxidant, anti-inflammatory, immune system modulation, and enabling photo induced biological activities, as a potential scaffold for photodynamic therapy and diagnostic applications, as a carrier for gene and drug delivery systems, and in serum protein profiling as material-enhanced laser desorption/ionization (MELDI) material for biomarker discovery.

As set forth above, the concentration of solubilized C60 achieved in the dissolved C60 mixture 324 and by the method 200 is much higher than achieved by other edible solvents. This higher concentration enables further innovation in terms of the delivery format of the C60 molecules 100. Known edible C60 mixtures are extremely low solubility liquid-based delivery formats, i.e. olive oil. The method 200 and the dissolved C60 mixture 324 enables the development of a product in edible strip format due to the higher concentration of soluble C60 molecules 100. Moreover, as shown in Table 1, d-limonene is the only known safe and edible solvent that has sufficient solubility to be practical for preparation and use in developing products that deliver non-trivial amounts of solubilized and bioactive C60. In Table 1, "ND" indicates that C60 in insoluble in the identified solvent. The solubility of C60 in d-limonene is included in the chart according to the results achieved by the method 200 and was not previously known in the art.

TABLE 1

Solubility of C60 in Various Solvents

| Solvent | Solubility Limit in mg/ml | Edible |
|---|---|---|
| methanol | ND | No |
| tetrahydrofuran | ND | No |
| isopropanol | ND | No |
| water | $1.3 \times 10^{-11}$ | Yes |
| acetone | 0.001 | No |
| ethanol | 0.0014 | Yes |
| n-pentane | 0.005 | No |
| cyclohexane | 0.036 | No |
| octanol | 0.0429 | No |
| n-hexane | 0.043 | No |
| n-decane | 0.071 | No |
| chloroform | 0.16 | No |
| dichloromethane | 0.26 | No |
| tetrachloromethane | 0.32 | No |
| benzonitrile | 0.41 | No |
| carbon tetrachloride | 0.447 | No |
| olive oil | 0.9 | Yes |
| benzene | 1.7 | No |
| toluene | 2.8 | No |
| decalins | 4.6 | No |
| xylene | 5.2 | No |
| anisole | 5.6 | No |
| carbon disulfide | 7.9 | No |
| tetralin | 16 | No |
| d-limonene | 16.67 | Yes |
| 1,2-dichlorobenzene | 27 | No |

TABLE 1-continued

Solubility of C60 in Various Solvents

| Solvent | Solubility Limit in mg/ml | Edible |
|---|---|---|
| 1-methylnaphthalene | 33 | No |
| 1-chloronaphthalene | 41 | No |

In addition to the above-described benefits, the C60 mixture 324 is a novel treatment for severe lung trauma. Many people suffer from severe respiratory distress syndrome (RDS) caused by inflammation and cytokine storm syndrome and other inflammatory disorders, which may occur as a result of viral infection such as the novel coronavirus (COVID-19), asthma, chronic obstructive pulmonary disease ("COPD"), lung irritation due to air pollution and/or smoking, other inflammatory conditions of the lungs, and other causes. For example, a viral infection or insult to a patent's lung tissue causes some patients to exhibit an over-reaction of the immune system known as hypercytokinemia or colloquially as a "cytokine storm." Hypercytokinemia is a severe immune reaction in which the body releases too many cytokines. While cytokines are part of a healthy immune response, an abundance of cytokines harms the body and may result in fever, inflammation, fatigue, and nausea among other negative responses. The cytokine storm then builds upon itself in a positive feedback loop, because these negative responses result in the release of additional cytokines, which may cause further severe damage to healthy lung tissue, fluid accumulation in the alveoli, loss of lung function, and in severe cases death. Moreover, these negative responses to the abundance of cytokines also result in the production of many free radical molecules, which of course are also harmful to the patient. Problematically, there are not always adequate treatments available for severe lung trauma and hypercytokinemia. Moreover, at times, the treatment for severe RDS includes supplemental oxygen via mechanical ventilation, which is an undesirable and often fatal option for most patients.

Figure 10:
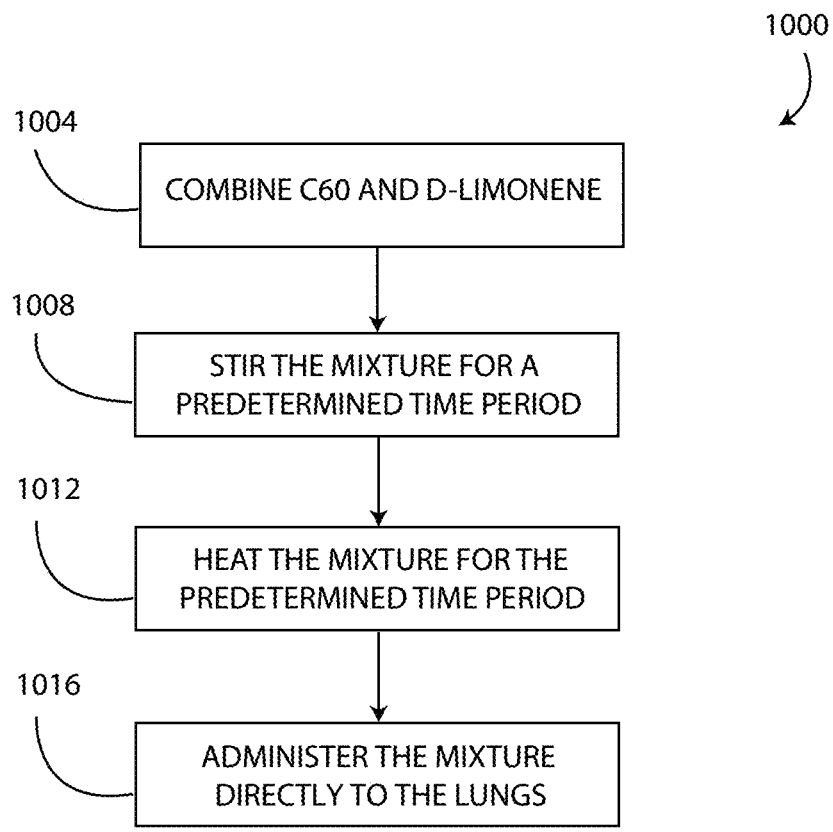
FIG. 10 is a flowchart illustrating an exemplary method of dissolving and administering C60 molecules in a limonene composition to form an edible, food-grade, dissolved C60 mixture that is inhalable directly into the lungs.

As shown in FIG. 10, a method 1000 is disclosed herein that delivers C60 molecules 100 in the form of the dissolved C60 mixture 324 directly into a patent's lungs to mitigate the patient's negative response(s) to viral infections, lung tissue trauma, and hypercytokinemia by at least reducing inflammation, removing free radicals, down regulating the overactive immune response, and helping restore homeostasis in the patient's airways. As such, the dissolved C60 mixture 324 reduces, prevents, and/or treats lung damage and other damage as a result of viral infection and/or hypercytokinemia.

At block 1004 of the method 1000, the C60 304 is combined with the liquid limonene composition 308 in a glass vessel (not shown) or any other heat-safe and non-reactive container. The C60 304 is added to the limonene composition 308 in any desired form including granular, chunky, crystalline, or pulverized.

Next, at blocks 1008 and 1012 of the method 1000, the C60 mixture 312 is stirred and heated for a predetermined time period. An exemplary predetermined time period is from twenty to forty minutes. In one embodiment, the predetermined time period is thirty minutes or approximately thirty minutes.

The stirring and heating of blocks 1008 and 1012 dissolves the C60 304 into the limonene composition 308, such that no clumps 316 of the C60 304 remain, and forms the dissolved C60 mixture 324. As noted above, the dissolved C60 mixture 324 is a homogenous liquid including molecules of the C60 304 that are fully dissolved into the limonene composition 308 with no clumps 316 of the C60 304.

The C60 mixture 324 is then cooled to room temperature. Due to the unique and critical process used to dissolve the C60 304, the C60 mixture is stable and no settling or precipitating of the C60 304 occurs in the limonene composition 308, even after six weeks of sitting at room temperature. As disclosed herein, a limit of solubility of the C60 304 in the limonene composition 308 is from approximately 16.67 mg/ml to approximately 20.0 mg/ml.

Figure 12:
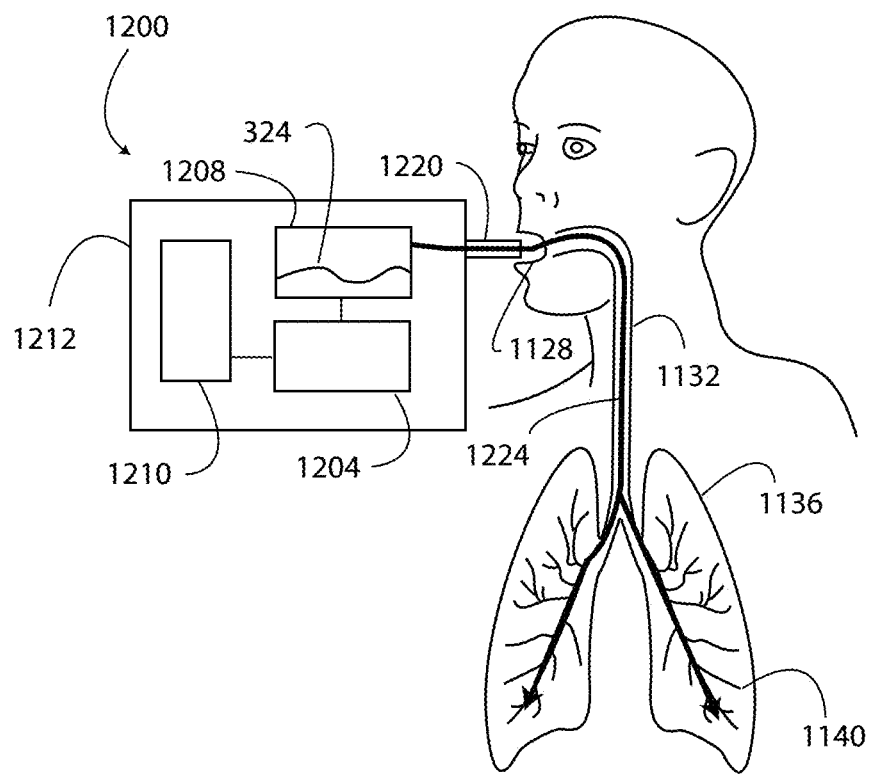
FIG. 12 is a block diagram illustration of a patient utilizing a vaporization system to inhalation administer the dissolved C60 mixture of FIG. 6.
Figure 13:
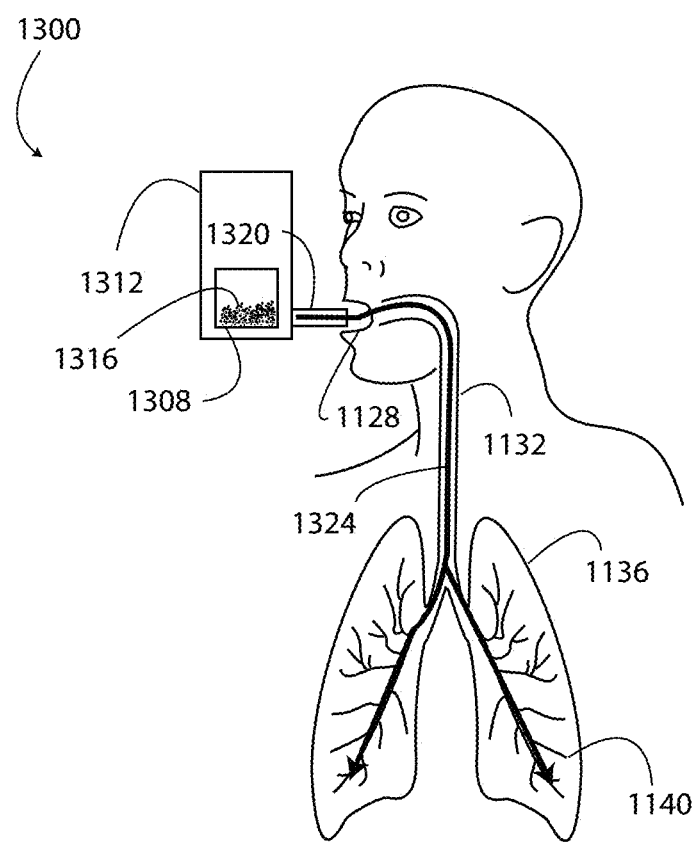
FIG. 13 is a block diagram illustration of a patient utilizing a dry powder inhaler system to inhalation administer the dissolved C60 mixture of FIG. 6.

Next, at block 1016 of the method 1000 the dissolved C60 mixture 324 is administered directly to the lungs of a patient or animal via at least one form of inhalation administration or inhalation therapy including nebulization (FIG. 11), vaporization (FIG. 12), and a dry powder inhalation (FIG. 13). As illustrated herein and as described below, inhalation administration enables the dissolved C60 mixture 324 to pass into a patient's mouth or nose, through the trachea, and directly into the patient's lungs through the left and right bronchus.

From the bronchus, the inhaled dissolved C60 mixture 324 passes into the bronchioles and makes direct contact with the alveoli. Thus, the inhaled dissolved C60 mixture 324 contacts the patient's entire airway and is available to contact directly and to treat the entire airway including the trachea, the left and right bronchus, the bronchioles, and the alveoli. The key action site is at the level of the alveoli in injured lung cells and vascular tissues. Stabilization is achieved by preventing further local damage by modulating numerous signaling pathways and inhibiting inflammatory mediators including cytokines and chemokines. Moreover, the inhaled dissolved C60 mixture 324 passes to the patient's bloodstream due to the direct contact of the dissolved C60 mixture 324 with the alveoli. As a result, the inhaled dissolved C60 mixture 324 is also carried throughout the patient's whole body via blood flow. This makes the inhaled dissolved C60 mixture 324 available to remove free radicals, treat inflammation, and provide numerous other health benefits to substantially all cells in the patient's body. As a powerful antioxidant, the C60 molecules 100 in this unique form, administered directly to the lung tissue, sufficiently moderates free radical production by the immune system to reduce or eliminate damage to healthy lung tissue, reduce inflammation and accumulation of fluid in the alveoli, maintain effective lung function, allow the damaged tissue to heal, while permitting the immune system to effectively destroy viral pathogens, for example.

Figure 11:
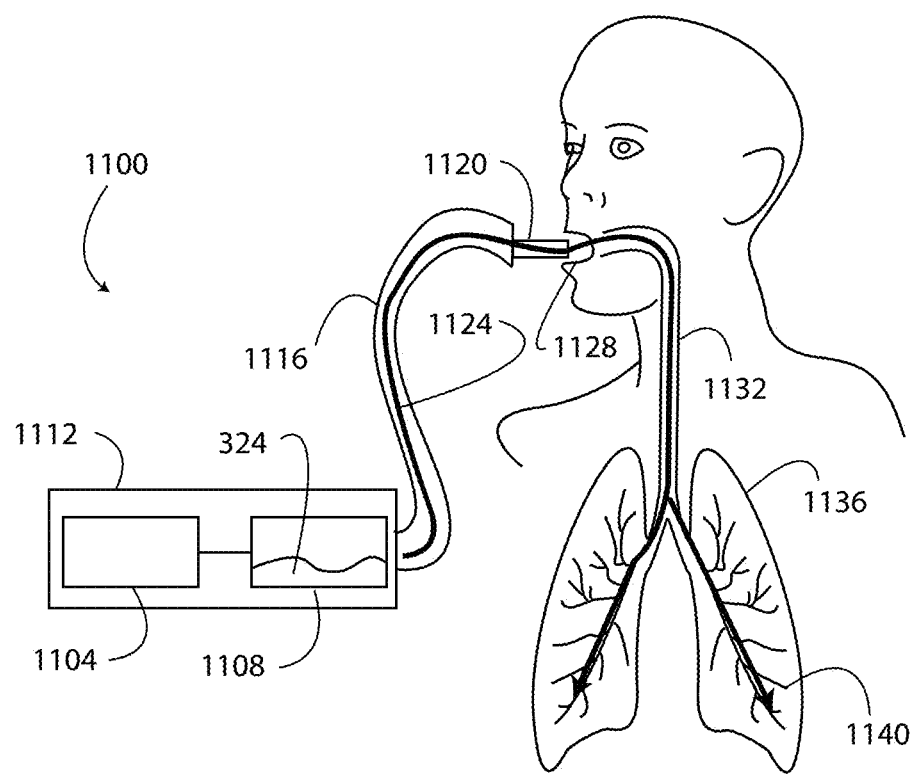
FIG. 11 is a block diagram illustration of a patient utilizing a nebulization system to inhalation administer the dissolved C60 mixture of FIG. 6.

With reference to FIG. 11, a nebulizer system 1100 is shown and nebulization is the form of inhalation administration. The nebulizer system 1100 includes a nebulizer unit 1104 operably connected to a reservoir 1108. The nebulizer unit 1104 and the reservoir 1108 are located within a housing 1112. Flexible tubing 1116 is operably connected to the nebulizer unit 1104, the reservoir 1108, and/or the housing 1112. The tubing 1116 is terminated in a mouthpiece 1120. The nebulizer system 1100 is shown as a stationary device, but in other embodiments the nebulizer system 1100 is provided as a handheld system or any other suitable system for nebulization of a liquid. In another embodiment, the mouthpiece 1120 is provided as a mask (not shown) that is placed over the patient's mouth and nose.

The nebulizer unit 1104 is configured to nebulize the liquid contents of the reservoir 1108 in order to form a mist and/or an aerosol 1124 that travels through the tubing 1116 to the mouthpiece 1120. The nebulizer unit 1104 is provided as a jet nebulizer unit, an ultrasonic nebulizer unit, and/or a mesh nebulizer unit. The nebulizer unit 1104 is supplied with electrical energy from a suitable power source such as a wall outlet or a battery (not shown).

The patient places the mouthpiece 1120 in his mouth and inhales through the mouthpiece 1120. When the patient inhales, the aerosol 1124 is drawn out of the housing 1112, through the tubing 1116, out of the mouthpiece 1120, into the patient's mouth 1128, through the patient's trachea 1132, and into the patient's lungs 1136. The nebulizer unit 1104 is configured to form a fine aerosol without large droplets, so that the aerosol 1124 is drawn deep into the lungs 1136 and in contact with the alveoli 1140.

According to block 1016 of the method 1000 of FIG. 10, the dissolved C60 mixture 324 is added to the reservoir 1108 and then the nebulizer unit 1104 is activated. The nebulizer unit 1104 generates the aerosol 1124 directly from the dissolved C60 mixture 324, such that the dissolved C60 mixture 324 is inhaled deep into the patient's lungs 1136 through tubing 1116 and the mouthpiece 1120. In one embodiment, the nebulization unit 1104 is configured to nebulize the dissolved C60 mixture 324 into the aerosol 1124 having liquid particles between 0.1 and 10 μm in diameter that are suitable for breathing and administering the C60 molecules 100 directly into the lungs 1136.

The tubing 1116 may also be connected to an oxygen mask (not shown), a ventilator tube of a mechanical ventilator (not shown), or an intubation tube (not shown) as an alternative to supplying the aerosol 1124 to the patient's lungs 1136 through the mouthpiece 1120.

In one embodiment, only the dissolved C60 mixture 324 is added directly to the reservoir 1108 with no other liquid inhalation agents. In another embodiment, the dissolved C60 mixture 324 is combined with a liquid inhalation agent, such as a saline solution or any other suitable liquid for the nebulization process, to form an inhalation mixture. The inhalation mixture is added to the reservoir 1108, and the aerosol 1124 is generated from the inhalation mixture. In each embodiment, the dissolved C60 mixture 324 provides a convenient means of dosing a predetermined amount of the C60 304 by easily measuring a liquid quantity of the dissolved C60 mixture 324. Accordingly, the dissolved C60 mixture 324 is easily dosed into a quantity of saline solution or other solution.

In a further embodiment, an aqueous liposomal dispersion including the liposomes 500 of FIG. 5 and an inhalation agent are added to the reservoir 1108 of the nebulizer system 1100 to form an inhalation mixture. Suitable inhalation agents include saline solution and any other suitable liquid. The nebulization unit 1104 is configured to nebulize the inhalation mixture into the aerosol 1124 having liquid particles between 0.1 and 10 μm in diameter that are suitable for breathing and delivering the liposomes 500 directly into the lungs 1136. Nebulization in this manner has been shown to be effective in delivering the liposomes 500 deep into the lungs 1136 including reaching the alveoli 1140. The inhalation mixture does not include any toxic or irritating components that could cause damage to the highly-sensitive lung tissue.

The aqueous, saline liposomal dispersion of C60 (i.e. the inhalation mixture) contains the solubilized C60 molecules 100 at a concentration of 100 μg per ml. Such a dosage is a safe and sufficient to mitigate excess free radical damage and reduce inflammation, without any negative side effects. C60 molecules 100 from the liposomes 500 in the body diffuse within minutes into cells and mitochondria to absorb excess free radical electrons where they are produced. C60 molecules 100 diffuse readily through cell walls and have been shown to have a residence time of about five days in the body, diffusing into and out of cells, and eventually being removed from the body in urine via a diffusion process.

Using the method 200 of FIG. 2 to prepare the dissolved C60 mixture 324 is critical in performing the inhalation administration of the method 1000 of FIG. 10. The method 200 dissolves C60 304 from a crystalline nanomaterial into a liquid mixture (such as limonene) including fully dissolved, unassociated, and free C60 molecules 100. Stated differently, there are no clumps or substantially no clumps of the C60 molecules 100 in the dissolved C60 mixture 324, and the C60 molecules 100 in the dissolved C60 mixture 324 are unattached to other molecules. Accordingly, the dissolved C60 mixture 324 (which may also include an inhalation agent and/or the liposomes 500) is easily and effectively formed into an aerosol having very small droplets that are inhalable deep into the patient's lungs 1136 without precipitating or adhering to the tubing 1116 or the mouthpiece 1120. Moreover, the droplets of the aerosol 1124 include typically a uniform dosage of the C60 molecules 100 so that the entire air tract of the patient is coated with C60 molecules 100 upon inhalation of the aerosol 1124.

Other preparations of C60 molecules 100 that are mixed with oil (such as olive oil) are entirely unsuitable for inhalation administration of C60. Olive oil cannot be nebulized or vaporized into the lungs 1136 without causing irritation and damage to the patient. Moreover, known non-toxic mixtures of C60 304 do not have the high concentration and uniform distribution of unassociated, fully-dissolved, and free C60 molecules 100 that makes the dissolved C60 mixture 324 particularly suited for accurately dosing C60 molecules 100 to a patient. Instead, known mixtures of C60 304 include clumps of C60 304 that make the mixtures unsuitable for accurate dosing and unsuitable for forming an effective aerosol through the nebulization process. Also, known liquid carriers (such as olive oil) are unsuitable for inhalation administration. The dissolved C60 mixture 324 and the method 1000 of FIG. 10 solve all of these problems by using the critical steps of method 200 to dissolve the C60 material 304 in an non-toxic liquid that highly solubilizes C60 molecules 100.

As shown in FIG. 12, a vaporizing system 1200 is shown and vaporization or "vaping" is the form of inhalation administration. The vaporizing system 1200 includes a heating element 1204 operably connected to a reservoir 1208 and a power source 1210, such as a rechargeable battery. The heating element 1204, the reservoir 1208, and power source 1210 are located within a housing 1212 (not shown to scale). A mouthpiece 1220 extends from the housing 1212. In another embodiment, the mouthpiece 1220 is provided as a mask (not shown) that is placed over the patient's mouth and nose.

The heating element 1204 is provided as a resistive heating element, for example, and is configured to vaporize the liquid contents of the reservoir 1208 in order to generate a vapor 1224 that is drawn out of the mouthpiece 1220 by the patient. The heating element 1204 vaporizes the liquid contents of the reservoir 1208 without combusting or burning the liquid contents of the reservoir 1208. In one embodiment, the patient places the mask over his mouth and nose to deliver the vaporized liquid into the nose, nasopharynx, mouth, and oral pharynx through the patient's trachea 1132, and into the patient's lungs 1136. The vapor 1224 includes very small particles that are drawn deep into the lungs 1136 and in contact with the alveoli 1140.

With reference again to block 1016 of the method 1000 of FIG. 10, the dissolved C60 mixture 324 is added to the reservoir 1208 and then the heating element 1204 is activated. The heating element 1204 vaporizes the dissolved C60 mixture 324 to form the vapor 1224. The vapor 1224 includes the C60 molecules 100.

In one embodiment, only the dissolved C60 mixture 324 is added directly to the reservoir 1208 with no other liquid vaporization agents. In another embodiment, the dissolved C60 mixture 324 is combined with a liquid vaporization agent such as propylene glycol, glycerin, or any other suitable liquid for the vaporization process, to form a vaporization mixture. The vaporization mixture is then added to the reservoir 1208. The dissolved C60 mixture 324 provides a convenient means of dosing a predetermined amount of the C60 304 by easily measuring a liquid quantity of the dissolved C60 mixture 324. Accordingly, the dissolved C60 mixture is easily dosed into a quantity of suitable vaporization agent.

Moreover, the vaporizing system 1200 is compatible with an aqueous liposomal dispersion including the liposomes 500 of FIG. 5 and an inhalation agent. Again, suitable inhalation agents include propylene glycol, glycerin, and the like. The heating element 1204 is configured to vaporize the aqueous liposomal dispersion into the vapor 1224 that includes the C60 molecules 100 and the liposomes 500. Vaporization in this manner has been shown to be effective in delivering the C60 molecules 100 and the liposomes 500 of the vapor 1224 deep into the lungs 1136 including reaching the alveoli 1140. The aqueous liposomal dispersion does not include any toxic or irritating components that could cause damage to the highly-sensitive lung tissue.

As shown in FIG. 13, an inhaler system 1300 is shown and dry powder inhalation is the form of inhalation administration. The inhaler system 1300 is a dry powder inhaler or a metered-dose dry inhaler and includes a dosage chamber 1308 configured hold a powdered dose of C60 1316 (also referred to herein as a C60 dry powder), a housing 1312, and a mouthpiece 1320 operably connected to the dosage chamber 1308 and extending from the housing 1312 (not shown to scale). In another embodiment, the mouthpiece 1320 is provided as a mask (not shown) that is placed over the patient's mouth and nose.

With reference again to block 1016 of the method 1000 of FIG. 10, the dissolved C60 mixture 324 formed into the C60 dry powder 1316 and then is added to the dosage chamber 1308. For example, the C60 dry powder 1316 is formed by mixing the C60 mixture 324 with a carrier powder, such as corn starch or powdered sucrose. The inhaler system 1300 administers the C60 dry powder 1316 directly into the lungs 1136. In particular, when the patient inhales, the C60 dry powder 1316 is drawn out of the dosage chamber 1308, into the patient's mouth 1128, through the patient's trachea 1132, and into the patient's lungs 1136. The C60 dry powder 1316 includes very small particles that are drawn deep into the lungs 1136 and in contact with the alveoli 1140. The inhaler system 1300 is typically more portable and may be more convenient for the patient than the nebulizer system 1100.

In one embodiment, the C60 dry powder 1316 contains C60 molecules 100 at a concentration designed to deliver 100 μg per dose. Our experience is that this is a safe and sufficient dose to mitigate excess free radical damage and reduce inflammation, without any negative side effects.

Using the method 200 of FIG. 2 to prepare the dissolved C60 mixture 324 is critical in preparing the C60 dry powder 1316. The method 200 dissolves C60 304 from a crystalline nanomaterial into a liquid (such as limonene) including fully dissolved, unassociated free C60 molecules 100. Stated differently, there are no clumps or substantially no clumps of the C60 molecules 100 in the dissolved C60 mixture 324, and the C60 molecules 100 in the dissolved C60 mixture 324 are unattached to other molecules. Accordingly, the dissolved C60 mixture 324 is easily and effectively mixed with the carrier powder without excess clumping.

With reference to FIG. 14, a nasal spray device 1400 is shown positioned for nasal administration of the dissolved C60 mixture 324, which is included in a nasal mixture 1404. The nasal spray device 1400 includes a reservoir 1408, a pump 1412, and an applicator 1416 having a nozzle 1420. The reservoir 1408 is configured to contain the nasal mixture 1404. In one embodiment, the nasal spray device 1400 is multi-dose device and the reservoir 1408 is configured to contain approximately sixteen milliliters (16 ml) of the nasal mixture 1404 which, as described herein, is sufficient for providing approximately one hundred twenty sprays 1424 of the nasal mixture 1404. In another embodiment, the reservoir 1408 is sized from five milliliters (5 ml) to one hundred milliliters (100 ml). In one embodiment, each spray 1424 is approximately 0.13 milliliters of the nasal mixture 1404 and includes approximately 2.17 mg of the C60 molecules 100.

The pump 1412 is operably connected to the reservoir 1408 and includes a pickup tube 1428 that extends into the reservoir 1408. The pickup tube 1428 is also referred to herein as a siphon tube. In one embodiment, the pump 1412 is a positive displacement pump that is powered by the user. Specifically, the user presses on a portion of pump 1412 that moves relative to the reservoir 1408 to activate the pump 1412 and to pump a predetermined amount of the nasal mixture 1404 toward the applicator 1416 and through the nozzle 1420. The pump 1412 is configured to pump the predetermined amount once per activation of the pump 1412. In one embodiment, the predetermined amount of the nasal mixture 1404 that is pumped by an activation of the pump 1412 is from 0.05 milliliters (0.05 ml) to 0.30 milliliters (0.30 ml). Accordingly, the spray 1424 includes from 0.05 milliliters (0.05 ml) to 0.30 milliliters (0.30 ml) of the nasal mixture 1404, and the spray 1424 includes from 0.83 mg to 5.0 mg of the C60 molecules 100 when the nasal mixture 1404 is only the dissolved C60 mixture 324.

The applicator 1416 and the nozzle 1420 are operably connected to the pump 1412 and the reservoir 1408. As shown in FIG. 14, the applicator 1416 is sized to fit within a nostril 1432 of the user. Accordingly, the applicator 1416 is approximately five to seven millimeters (5 mm to 7 mm) across and is approximately thirty millimeters (30 mm) long. In one embodiment, the applicator 1416 has a frustoconical configuration. The applicator 1416, in other embodiments, has any other size and shape suitable for placement in the nostril 1432 of the user.

The nozzle 1420 is mounted at an end of the applicator 1416. The nozzle 1420 is configured to convert the predetermined amount of the nasal mixture 1404, as pumped by the pump 1412, into the spray 1424. The spray 1424 may be configured as a coarse spray, a medium spray, a fine spray, a mist, a fog, and an aerosol depending on the configuration of the nozzle 1420. The spray pattern of the spray 1424 generated by the nozzle 1420, in one embodiment, is a full cone spray and is configured to contact as much of a nasal cavity 1436 of the user as is accessible through the nostril 1432 (as may be assisted by the inhalation of the spray 1424 by the user). In another embodiment, the shape of the spray 1424 is a fan or a hollow cone as may be appropriate for the anatomy of a particular user. The nozzle 1420 is configured to emit and/or to generate the spray 1424.

In another embodiment of the nasal spray device 1400, the pump 1412 is not included, and the reservoir 1408 is configured to be squeezed by the user to generate the spray 1424 through the nozzle 1420. In such an embodiment, the reservoir 1408 is formed from a resilient material, such as plastic. Squeezing the reservoir 1408 forces the nasal mixture 1404 through the nozzle 1420 to generate the spray 1424.

The nasal mixture 1404 is contained in the reservoir 1408 and includes the dissolved C60 mixture 324. The nasal mixture 1404 is pumped by the pump 1412 through the applicator 1416 and the nozzle 1420 to form the spray 1424. The spray 1424 is formed from the nasal mixture 1404. Accordingly, the nasal mixture 1404 includes the C60 molecules 100 dissolved in the limonene composition 308. The nasal mixture 1404 is configured for nasal administration directly to the nasal cavity 1436 of the user. Nasal administration includes intranasal delivery and intranasal administration. Nasal administration causes the nasal mixture 1404 to be applied directly to the surfaces, features, and elements of the user's nasal cavity 1436.

In one embodiment, the nasal mixture 1404 includes only the dissolved C60 mixture 324. In another embodiment, the nasal mixture 1404 includes a nasal solution mixed with the dissolved C60 mixture 324. For example, the nasal mixture 1404 may be approximately 75% of the dissolved C60 mixture 324 and 25% of the nasal solution. The amount of the nasal solution mixed with the dissolved C60 mixture 324 may range from 5% to 90%. Exemplary nasal solutions include water and saline.

In another embodiment, the nasal mixture 1404 includes the liposomes 500 of FIG. 8. Specifically, the nasal mixture 1404 includes the liposomes 500 mixed with the nasal solution, such as water and/or saline. In such an embodiment, the spray 1424 of the nasal mixture 1404 is configured to spray the liposomes 500 directly into the nasal cavity 1436 of the user. The shell 504 of the liposomes 500 is configured to dissolve in response to being in contact with the surfaces, the features, and the elements of the nasal cavity 1436. When the liposomes 500 dissolve and/or break, the dissolved C60 mixture 324 escapes from the liposomes 500 and contacts directly the surfaces, the features, and the elements of the nasal cavity 1436, thereby providing therapeutic benefits. The nasal solution is selected so as not to dissolve the shell 504 of the liposomes 500. That is, the liposomes 500 remain intact and homogenously distributed through the nasal solution when included in the nasal mixture 1404. The liposomes 500 are stable and do not breakdown in the nasal mixture 1404.

Figure 15:
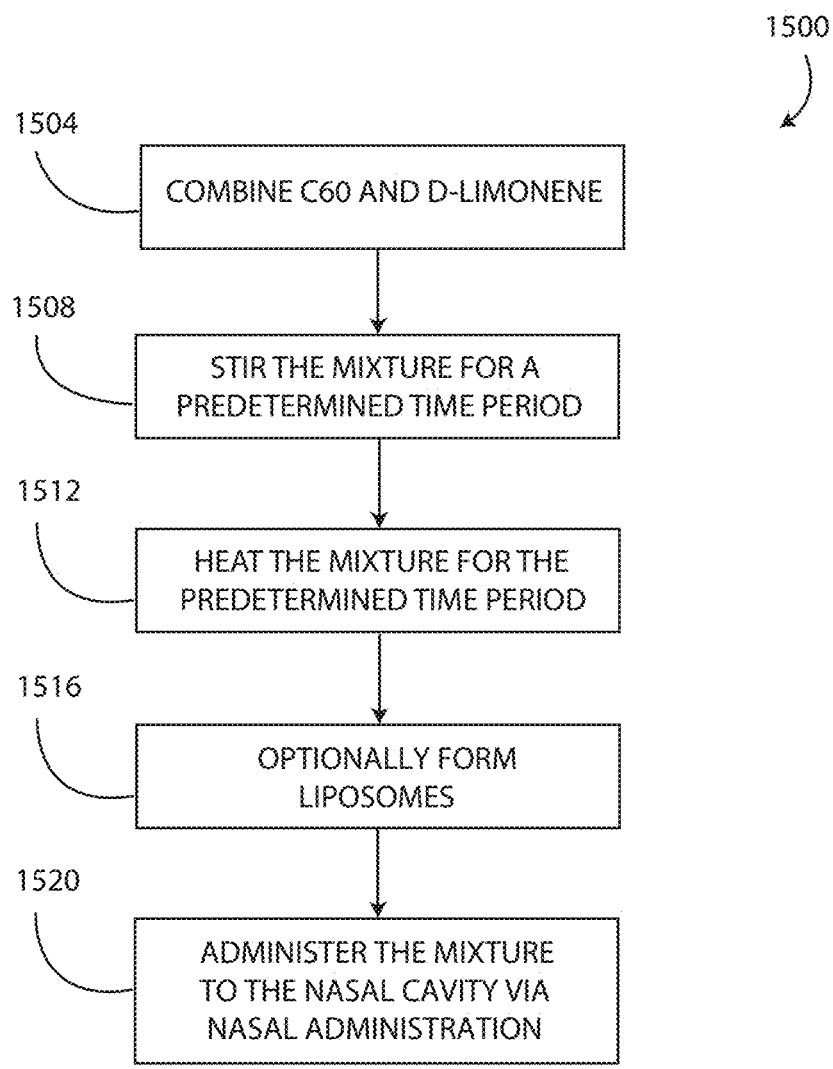
FIG. 15 is a flowchart illustrating an exemplary method of dissolving C60 molecules in a limonene composition to form an edible, food-grade, dissolved C60 mixture that is suitable for nasal administration to a user.

As shown in FIG. 15, a method 1500 delivers the C60 molecules 100 to the user's nasal cavity 1436 to mitigate the user's negative response(s) to allergens, viral infections, and/or pathogens by reducing inflammation, removing free radicals, helping the injured cells to heal and return the surrounding environment to homeostasis.

At block 1504 of the method 1500, the C60 304 (i.e., the C60 molecules 100) is combined with the liquid limonene composition 308 in a glass vessel (not shown) or any other heat-safe and non-reactive container. The C60 304 is added to the limonene composition 308 in any desired form including granular, chunky, crystalline, or pulverized.

Next, at blocks 1508 and 1512 of the method 1500, the C60 mixture 312 is stirred and heated for a predetermined time period. An exemplary predetermined time period is from twenty to forty minutes. In one embodiment, the predetermined time period is thirty minutes or approximately thirty minutes.

The stirring and heating of blocks 1508 and 1512 dissolves the C60 304 into the limonene composition 308, such that no clumps 316 of the C60 304 remain, and forms the dissolved C60 mixture 324. As noted above, the dissolved C60 mixture 324 is a homogenous liquid including the molecules of the C60 304 that are fully dissolved into the limonene composition 308 with no clumps 316 of the C60 304.

The C60 mixture 324 is then cooled to room temperature. Due to the unique and critical process used to dissolve the C60 304, the C60 mixture 324 is stable and no settling or precipitating of the C60 304 occurs in the limonene composition 308, even after six weeks of sitting at room temperature. As disclosed herein, a limit of solubility of the C60 304 in the limonene composition 308 is from approximately 16.67 mg/ml to approximately 20.0 mg/ml.

Next, the dissolved C60 mixture 324 is added to the reservoir 1408 of the nasal spray device 1400. In particular, the dissolved C60 mixture 324 is add directly without being mixed with the nasal solution. Alternatively, the dissolved C60 mixture 324 is mixed with the nasal solution to form the nasal mixture 1404, and the nasal mixture 1404 is added to the reservoir 1408.

Optionally, at block 1516 a plurality of liposomes 500 are formed from the C60 mixture 324. The liposomes 500 are formed by mixing the dissolved C60 mixture 324 with the phospholipid 504 and/or another suitable lipid. Each of the liposomes 500 includes the shell 504 of the phospholipid 504 surrounding or encapsulating a quantity of the dissolved C60 mixture 324. The liposomes 500 are then mixed with the nasal solution to form the nasal mixture 1404. The nasal mixture 1404 including the liposomes 500 is added to the reservoir 1408.

At block 1520 of the method 1500, the dissolved C60 mixture 324 is administered to the nasal cavity 1436 of a user (human or animal) via the nostril 1432 through a process of nasal administration. In a first embodiment, the nasal mixture 1404 includes only the dissolved C60 mixture 324, and the nasal mixture 1404 is administered directly to the nasal cavity 1436 as the spray 1424. In another embodiment, the dissolved C60 mixture 324 is mixed with the nasal solution to form the nasal mixture 1404, and the nasal mixture 1404 is administered to the nasal cavity 1436 as the spray 1424. In embodiments having the liposomes 500, the liposomes 500 are mixed with the nasal solution to form the nasal mixture 1404, and the nasal mixture 1404 having the liposomes 500 is administered to the nasal cavity 1436 as the spray 1424.

Figure 14:
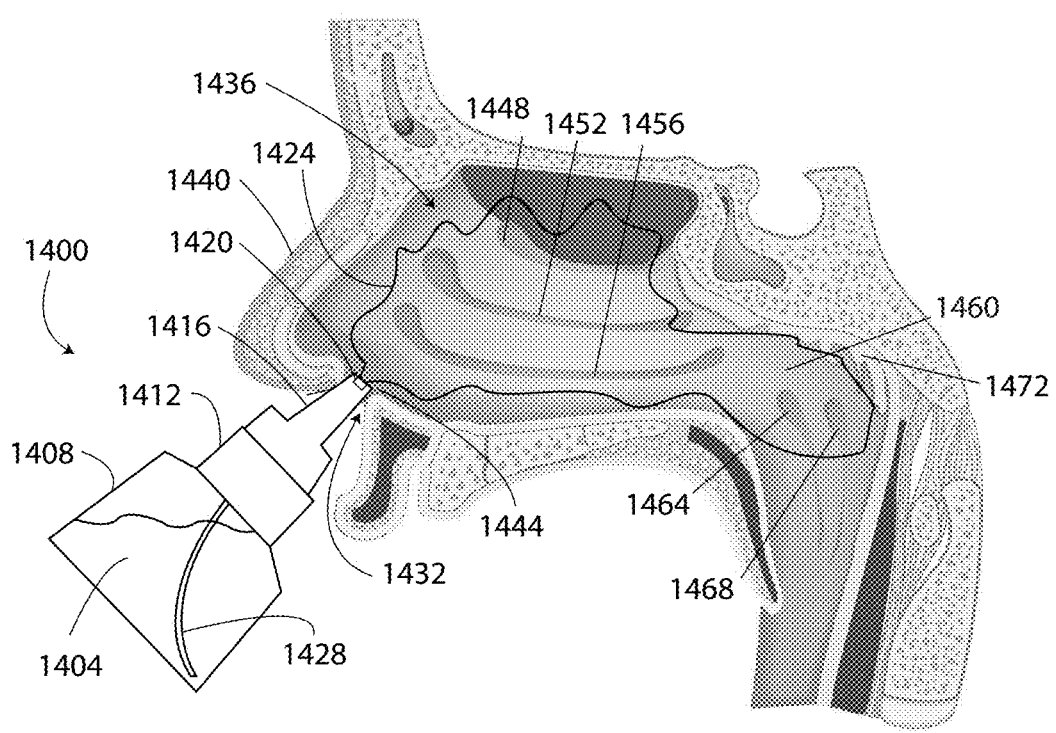
FIG. 14 is a cross sectional view of a user and a nasal spray device positioned for nasal administration of a nasal mixture including the dissolved C60 mixture of FIG. 6 to the nasal cavity of the user.

As shown in FIG. 14, administering the nasal mixture 1404 includes placing the applicator 1416 and the nozzle 1420 within a selected nostril 1432 of the nose 1440 of the user. In an example, the applicator 1416 is placed at least partially into the nostril 1432 and the nozzle 1420 is placed fully within the nostril 1432 in the nasal vestibule 1444.

Next, during administration of the nasal mixture 1404, the user activates the pump 1412 in order to generate the spray 1424 of the nasal mixture 1404. The pump 1412 is activated by squeezing the pump 1412. In embodiments of the nasal spray device 1400 not having the pump 1412, the user squeezes the reservoir 1408 to generate the spray 1424.

The spray 1424 exits the nozzle 1420 and spreads in the spray pattern. The spray 1424 is directed into the nasal cavity 1436. In some embodiments, the user inhales to draw the spray 1424 deeper and/or further into the nasal cavity 1436. The spray 1424 directly contacts all the surfaces, the features, and the elements of the nasal cavity 1436. As shown in FIG. 14, exemplary surfaces, features, and elements of the nasal cavity 1436 that are contacted by the spray 1424 include, but are not limited to, the superior turbinate 1448, the middle turbinate 1452, the inferior turbinate 1456, the nasopharynx 1460, the Eustachian tube orifice 1464, the fossa of Rosenmüller 1468, and the adenoid pad 1472.

When the spray 1424 enters the nasal cavity 1436, the C60 molecules 100 are positioned directly on the surfaces, the features, and the elements of the nasal cavity 1436. Moreover, in embodiments having the liposomes 500, when the spray 1436 contacts the surfaces, the features, and the elements of the nasal cavity, the shell 504 of the liposomes 500 melt, break, and/or dissolve, and the C60 molecules 100 escape the liposomes 500 and contact the surfaces, the features, and the elements of the nasal cavity 1436. Accordingly, the dissolved C60 mixture 324 is administered directly to the nasal cavity 1436, and the C60 molecules 100 are positioned to treat the entire nasal cavity 1436. Moreover, at least some of the dissolved C60 mixture 324 passes to the patient's bloodstream due to the direct contact of the dissolved C60 mixture 324 with the surfaces, the features, and the elements of the nasal cavity 1436. As a result, at least some of the sprayed C60 molecules 100 are carried throughout the patient's whole body via blood flow and makes the C60 molecules 100 available to the body.

The sprayed C60 molecules 100 are available to remove free radicals, reduce inflammation, and provide numerous potential health benefits to substantially all cells in the user's body. For example, the C60 molecules 100, when in contact with the surfaces, features, and elements of the nasal cavity 1436, reduce signs and symptoms caused by allergic rhinitis. Allergic rhinitis is a chronic upper respiratory disease caused by exposure to allergens that induce immunoglobulin E (IgE) mediated inflammation to the mucus membranes lining the nose and within the nasal cavity 1436. It is estimated that 10-40% of the world's population is affected by allergic rhinitis and it is associated with significant medical and economic burden. The C60 molecules 100 administered via nasal administration significantly reduce IgE levels, thereby reducing the inflammation and histamine release associated with allergic rhinitis and increasing the comfort of the user. Moreover, in animal models C60 molecules 100 have demonstrated the ability to reduce IgE significantly when applied topically. Accordingly, topical and/or nasal therapies including the C60 molecules 100 offer many advantages over oral therapies, such as (i) delivery of the C60 molecules 100 in greater concentrations to nasal receptor sites at the source of the allergic inflammation, and (ii) a reduction in the risk of systemic side effects. The method 1500 of administering the C60 molecules 100 is an adjuvant or treatment of allergic rhinitis.

Moreover, as a powerful antioxidant, the C60 molecules 100, administered to the nasal cavity 1436 according to the method 1500, modulate the user's immune system by causing a significant reduction in IgE production caused by chronic airborne environmental allergens. Accordingly, the sprayed C60 molecules 100 reduce the release of histamines and other cytokines in mast cells, basophils, and eosinophils leading to improvements in the user's allergic response to environmental allergens such as dust mites. The reduction in free radicals caused by the sprayed C60 molecules 100 also helps healing in the nose including healing of the surfaces, features, and elements of the nasal cavity 1436. Accordingly, the nose and nasal administration is an effective delivery system for the C60 molecules 100 that enables the C60 molecules 100 to remove excess free radicals, which are part of the pathogenesis of several diseases.

The C60 molecules 100 nasally administered according to the method 1500 are useful for additional applications including treating cardiac disease, because the C60 molecules 100 are delivered to the central nervous system (CNS) through the olfactory and/or trigeminal nerves. As a result, delivery of the C60 molecules 100 according to the method 1500 enables treatment for cardiovascular issues, migraine headaches, hypertension, Alzheimer's disease, and multiple sclerosis. Moreover, administration of the C60 molecules 100 according to the method 1500 also administers the C60 molecules 100 for use as a dietary and/or nutritional supplement.

Figure 16:
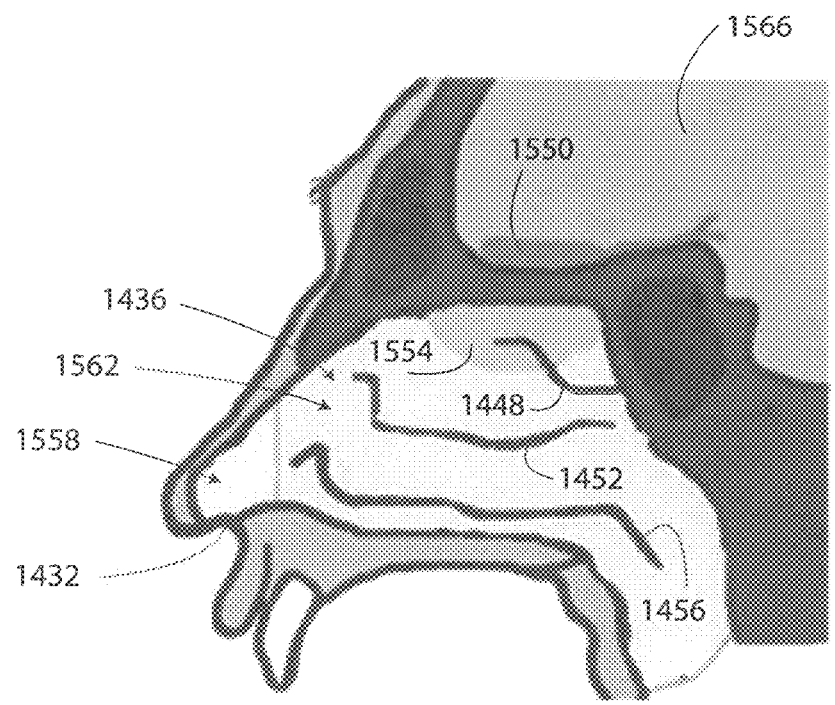
FIG. 16 is another cross sectional view of the user showing the nasal cavity.

With reference to FIG. 16, a process is described for intranasal treatment for cardiovascular and CNS issues using the C60 molecules 100 and the method 1500. As shown in FIG. 16, the user's nasal cavity 1436 includes several regions and elements including the olfactory bulb 1550, the olfactory epithelium 1554, the squamous mucosa 1558 located at the opening of the nostril 1432, and the respiratory epithelium 1562 including the inferior turbinate 1456, the middle turbinate 1452, and the superior turbinate 1448. The spray 1424 generated according to the method 1500 is configured to administer the sprayed C60 molecules 100 to each of these regions and elements. Specifically, the spray 1424 including the C60 molecules 100 contacts directly the olfactory epithelium 1554 and is absorbed directly into the user's bloodstream. In particular, from the olfactory epithelium 1554, the absorbed C60 molecules 100 travel to the olfactory bulb 1550 and then directly into the user's brain 1566, thereby bypassing the blood-brain barrier. As such, administration of the C60 molecules 100 according to the method 1500 delivers a higher dose and a more effective dose of the C60 molecules 100 directly into the brain 1566, as compared to other administration methods of delivering C60.

Figure 17:
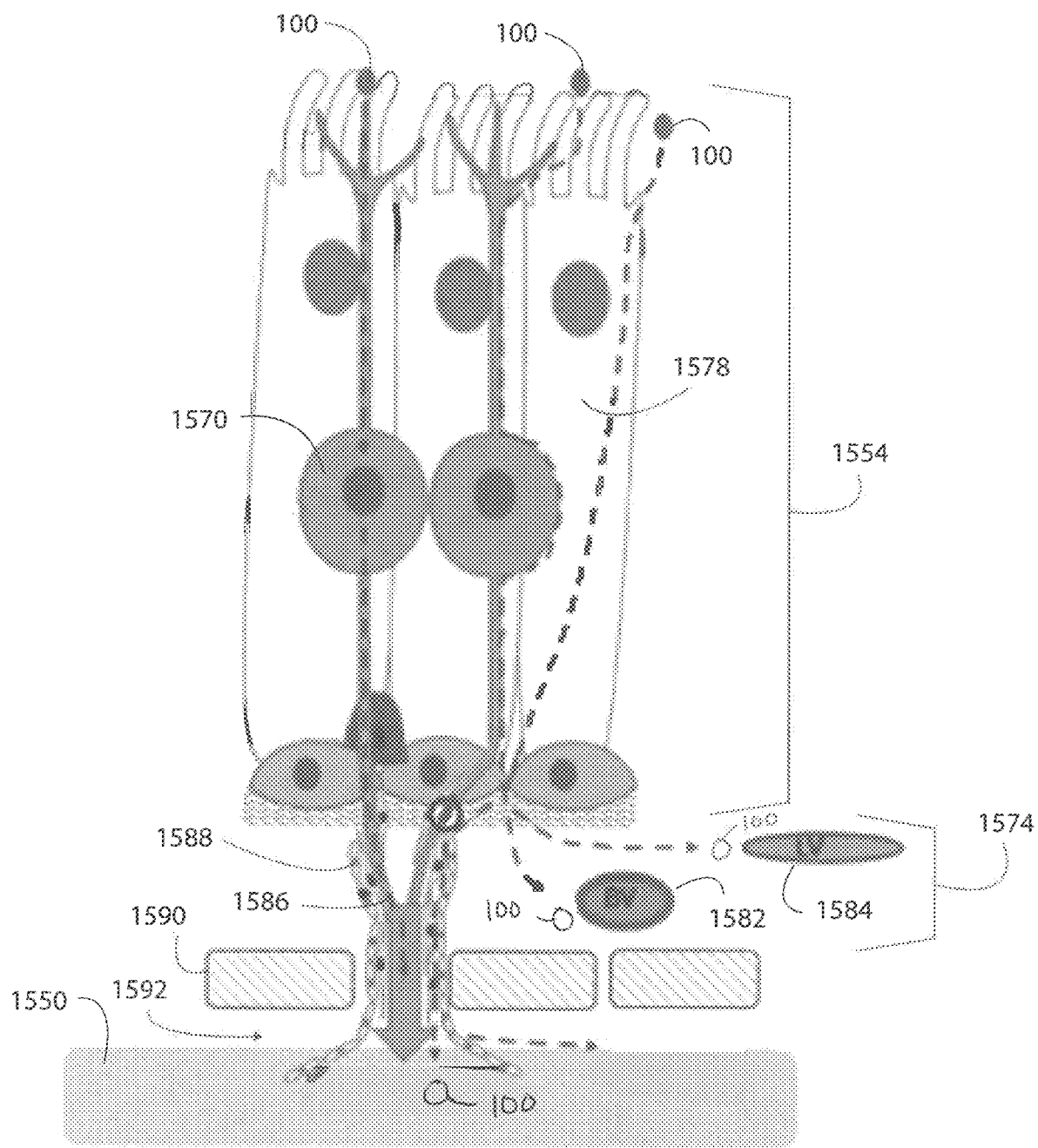
FIG. 17 is a cross sectional view showing the user's olfactory bulb, cribriform plate, lamina propria, and olfactory epithelium and also showing three pathways taken by internalized C60 molecules administered nasally.

FIG. 17 shows several exemplary pathways for the C60 molecules 100 through the olfactory epithelium 1554. First, the C60 molecules 100 sprayed according to the method 1500 bind to a receptor such as an olfactory sensory neuron (OSN) 1570 and then are internalized by, for example, receptor-mediated endocytosis. According to an intracellular path (left), the internalized C60 molecule 100 travels through the OSN 1570 towards the olfactory bulb 1550. According to a paracellular path (middle), the internalized C60 molecules 100 uses leaky passages within the olfactory epithelium 1554 and travels paracellular into the lamina propria 1574. According to a transcellular path (right), the internalized C60 molecule 100 is transported through the sustentacular cells 1578 to the lamina propria 1574. From there, the internalized C60 molecules 100 on each path are (i) absorbed by local blood vessels 1582 reaching blood circulation and/or (ii) absorbed by lymphatic vessels 1584 and drained into the deep cervical lymph nodes of the neck (not shown). The internalized C60 molecules 100 may also use perineural spaces between the olfactory ensheathing cells (OECs) 1586 and olfactory nerve fibroblasts 1588 to travel to the olfactory bulb 1550. According to this approach after passing the cribriform plate 1590, the internalized C60 molecules 100 reach the cerebrospinal fluid 1592 and distribute through the different regions of the brain 1566.

Moreover, depending on the application there may be specific benefits to delivering the C60 molecules 100 to the user via combinations of nasal administration, oral administration, buccal administration, topical administration, intravenous (IV) administration, and/or inhalation administration including nebulization, vaporization, and dry powder directly to the lungs.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method of administering C60 to a user, comprising:
combining C60 molecules with a limonene composition to form a C60 mixture;
heating the C60 mixture to a predetermined temperature for a predetermined time period to dissolve the C60 molecules into the limonene composition to form a dissolved C60 mixture; and
administering the dissolved C60 mixture to a nasal cavity of the user via nasal administration.

2. The method as claimed in claim 1, the administering the dissolved C60 mixture comprising:
adding the dissolved C60 mixture to a reservoir of a nasal spray device having an applicator and a nozzle;
positioning the applicator at least partially in a nostril of the user; and
generating a spray of the dissolved C60 mixture from the nozzle,
wherein the spray is directed into the nasal cavity.

3. The method as claimed in claim 1, the administering the dissolved C60 mixture comprising:
mixing the dissolved C60 mixture with a nasal solution to form a nasal mixture;
adding the nasal mixture to a reservoir of a nasal spray device having an applicator and a nozzle;
positioning the applicator in a nostril of the user; and
generating a spray of the nasal mixture using the nozzle, wherein the spray is directed into the nasal cavity.

4. The method as claimed in claim 3, wherein the nasal solution includes saline.

5. The method as claimed in claim 1, wherein the dissolved C60 mixture is stable, such that no settling or precipitating of the C60 molecules occurs.

6. The method as claimed in claim 1, wherein the limonene composition is at least 95% d-limonene by volume.

7. The method as claimed in claim 1, wherein the dissolved C60 mixture is homogenous and includes at least 16.67 mg of the dissolved C60 molecules per milliliter of the limonene composition.

8. A nasal spray system, comprising:
a reservoir;
an applicator having a nozzle configured to emit a spray, the applicator operably connected to the reservoir; and
a nasal mixture including a dissolved C60 mixture, the nasal mixture contained in the reservoir, and the nasal mixture configured to be sprayed by the nozzle,
wherein the dissolved C60 mixture includes C60 molecules dissolved in a limonene composition, and
wherein the nasal mixture is configured for administration to a nasal cavity of a user via nasal administration.

9. The nasal spray system as claimed in claim 8, further comprising:
a pump operably connected to the reservoir and the nozzle, the pump configured to be activated to generate the spray through the nozzle.

10. The nasal spray system as claimed in claim 8, wherein the dissolved C60 mixture is formed by (i) combining C60 molecules with the limonene composition to form a C60 mixture, and (ii) heating the C60 mixture to a predetermined temperature for a predetermined time period to dissolve the C60 molecules into the limonene composition to form the dissolved C60 mixture.

11. The nasal spray system as claimed in claim 8, wherein the nasal mixture includes saline.

12. The nasal spray system as claimed in claim 8, wherein:
the nasal mixture includes a plurality of liposomes,
the plurality of liposomes are formed by mixing the dissolved C60 mixture with a phospholipid, and
each liposome includes a shell formed from the phospholipid that is configured to surround a quantity of the dissolved C60 mixture.

13. A method of administering C60 to a user, comprising:
combining C60 molecules with a limonene composition to form a C60 mixture;
heating the C60 mixture to a predetermined temperature for a predetermined time period to dissolve the C60 molecules into the limonene composition to form a dissolved C60 mixture;
mixing the dissolved C60 mixture with a phospholipid to form a plurality of liposomes;
combining the plurality of liposomes with a nasal solution to form a nasal mixture; and
administering the nasal mixture to a nasal cavity of the user via nasal administration.

14. The method as claimed in claim 13, the administering the nasal mixture comprising:
adding the nasal mixture to a reservoir of a nasal spray device; and
generating a spray of the nasal mixture with a nozzle of the nasal spray device,
wherein the spray is drawn into the nasal cavity in response to the user inhaling the spray in order to administer the dissolved C60 mixture directly to the nasal cavity.

15. The method as claimed in claim 13, the administering the nasal mixture comprising:
adding the nasal mixture to a reservoir of a nasal spray device;
generating a spray of the nasal mixture with a nozzle of the nasal spray device; and
directing the spray into the nasal cavity.

16. The method as claimed in claim 13, wherein the nasal solution includes saline.

17. The method as claimed in claim 13, wherein the limonene composition is at least 95% d-limonene by volume.

18. The method as claimed in claim 13, wherein the dissolved C60 mixture is homogenous and includes at least 16.67 mg of the dissolved C60 molecules per milliliter of the limonene composition.

* * * * *